(12) United States Patent
Mizuno et al.

(10) Patent No.: US 7,519,979 B2
(45) Date of Patent: Apr. 14, 2009

(54) OPTICAL HEAD HAVING A POSITION DETECTION PORTION AND OPTICAL DISK DEVICE UTILIZING THE OPTICAL HEAD

(75) Inventors: Osamu Mizuno, Osaka (JP); Hideki Aikoh, Osaka (JP); Takeharu Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 274 days.

(21) Appl. No.: 10/588,113

(22) PCT Filed: Jun. 30, 2005

(86) PCT No.: PCT/JP2005/012091

§ 371 (c)(1),
(2), (4) Date: Jul. 31, 2006

(87) PCT Pub. No.: WO2006/003997

PCT Pub. Date: Dec. 1, 2006

(65) Prior Publication Data

US 2007/0109923 A1    May 17, 2007

(30) Foreign Application Priority Data

Jul. 6, 2004    (JP)    ............................. 2004-199135

(51) Int. Cl.
*G11B 7/00*    (2006.01)
(52) U.S. Cl. ................................... 720/675; 369/44.32
(58) Field of Classification Search .................. None
See application file for complete search history.

(56) References Cited

U.S. PATENT DOCUMENTS

| | | | | |
|---|---|---|---|---|
| 4,065,188 A | * | 12/1977 | Ridler et al. | 310/90.5 |
| 5,875,166 A | * | 2/1999 | Ikegame et al. | 369/112.23 |
| 6,430,137 B1 | | 8/2002 | Saimi et al. | |
| 6,661,750 B2 | | 12/2003 | Saimi et al. | |
| 6,856,584 B2 | | 2/2005 | Saimi et al. | |
| 6,968,563 B2 | * | 11/2005 | Nagai | 720/682 |
| 7,289,300 B2 | * | 10/2007 | McCarthy | 360/261.1 |

(Continued)

FOREIGN PATENT DOCUMENTS

JP    7-57276    3/1995

(Continued)

OTHER PUBLICATIONS

Machine translation of Mizuno et al., JP 2004-039068, published Feb. 5, 2004.*

(Continued)

*Primary Examiner*—Peter Vincent Agustin
(74) *Attorney, Agent, or Firm*—Wenderoth, Lind & Ponack, L.L.P.

(57) ABSTRACT

An aberration correction lens 4 is disposed in a space between a laser light source 3 and an objective lens 5, and a lens holder 10 is frictionally coupled to a drive shaft 7 via a frictional holding body 8. A piezoelectric element 6 is provided to one end of the drive shaft 7. The piezoelectric element 6 extends and contracts in response to an applied voltage. The lens holder 10 is moved relatively with respect to the drive shaft 7 in the drive shaft direction by varying a change rate when the applied voltage to the piezoelectric element 6 is increased and decreased.

17 Claims, 20 Drawing Sheets

U.S. PATENT DOCUMENTS

| | | |
|---|---|---|
| 2003/0021219 A1 | 1/2003 | Nagai |
| 2004/0076089 A1 | 4/2004 | Kurita et al. |

FOREIGN PATENT DOCUMENTS

| | | |
|---|---|---|
| JP | 10-3687 | 1/1998 |
| JP | 11-37160 | 2/1999 |
| JP | 11-134698 | 5/1999 |
| JP | 2000-155979 | 6/2000 |
| JP | 2002-352449 | 12/2002 |
| JP | 2003-338069 | 11/2003 |
| JP | 3505525 | 12/2003 |
| JP | 2004-39068 | 2/2004 |
| JP | 2004-77705 | 3/2004 |
| WO | 03/055053 | 7/2003 |

OTHER PUBLICATIONS

Chinese Office Action issued Jan. 25, 2008 (along with English language translation) in the Chinese Patent Application No. 200580003961.7.

* cited by examiner

OPTICAL HEAD HAVING A POSITION DETECTION PORTION AND OPTICAL DISK DEVICE UTILIZING THE OPTICAL HEAD

TECHNICAL FIELD

The present invention relates to an optical head having a system for correcting spherical aberration of a light spot irradiated onto an optical disk, an optical disk drive, and an optical disk device.

BACKGROUND ART

In order to meet an ever-increasing data recording density of an optical disk in recent years, the wavelength of a laser beam is becoming shorter and the NA of the objective lens is becoming higher for an optical head used to record and play back data. An optical head using the objective lens having a high NA, however, has a problem that it is quite sensitive to influences of spherical aberration caused by an error of thickness of the cover layer of the optical disk used as a recording medium.

To solve this problem, as is disclosed in Patent Document 1, an optical head provided with spherical aberration correcting means has been known. The optical head disclosed in Patent Document 1 performs electromagnetic driving by supporting a lens used to correct the spherical aberration on leaf springs.

Hereinafter, the configuration of the optical head will be described with reference to FIG. 20. As is shown in FIG. 20, the X axis is used for the optical axis direction. An aberration correction lens 41 is mounted on a lens holder 44, and a coil 42 is wound around the lens holder 44. A magnetic field is applied to the coil 42 by a magnet 43.

Leaf springs 45 are connected to an aberration correction base 46. Each blade spring 45 supports the lens holder 44 to be movable chiefly in the direction X. By providing two leaf springs 45, the aberration correction lens 41 is allowed to move in parallel easily in the X axis direction. Also, by making the blade plate 45 to be of a folding structure, it is possible to suppress a displacement of the aberration correction lens 41 in the Y axis direction caused by bending of the leaf springs 45. A position sensor 47 that detects the position of the aberration correction lens 41 in the optical axis direction is provided. In this example, the position sensor comprises an optical sensor.

When a specific DC current is supplied to the coil 42, the lens holder 44 receives thrust in the optical direction due to the function of the magnetic field induced by the magnet 43, and the leaf springs 45 bend accordingly. The aberration correction lens 41 then undergoes relative displacement with respect to the aberration correction base 46. In this instance, the aberration correction lens 41 stops and stands still at a position at which an elastic restoring force of the leaf springs 45 and the thrust that the coil 42 is receiving achieve equilibrium. The position sensor 47 generates a signal corresponding to the position of the aberration correction lens 41 in this instance, which enables position control to correct a position error from the target position by performing feedback control on a current value of the coil 42 as needed.

A flux of light having passed through the aberration correction lens 41 changes its divergent-convergence state with the position in the optical axis direction (the direction X), which gives rise to spherical aberration. Spherical aberration caused in this instance is the aberration inverse to the spherical aberration caused by a thickness error of the cover layer of the optical disk when the flux of light goes incident on the objective lens. The spherical aberration of a light spot irradiated onto the optical disk can be therefore corrected by the aberration correction lens 41.

Patent Document 1: Japanese Patent No. 3505525 (pp. 4-6, FIG. 4)

DISCLOSURE OF THE INVENTION

The optical head in the related art described as above, however, has problems as follows.

That is to say, the aberration correction lens 41 is moved in the X axis direction; however, because the aberration correction lens 41 is supported on the leaf springs 45, not only does it oscillate in the X axis direction, but it also rotates about the Y axis to no small extent. Hence, when the system is subjected to a disturbance and starts to oscillate about the Y axis, it is no longer observable or controllable. The same applies to the displacement about the Z axis and the displacement in the Y axis direction, that is, in the buckling direction of the leaf springs.

As a result, even when the aberration correction lens 41 oscillates in a direction other than the X axis direction, it fails to suppress a flux of light coming out from the aberration correction lens 41, which gives rises to a recording error, defective playback, etc. of the optical disk.

In addition, because it is necessary to keep feeding a current to the coil 42 to let the aberration correction lens 41 stand still so as not to undergo displacement, power consumption is increased.

Further, when a multi-layer optical disk is used as the subject in order to increase the density, it is necessary to widen a movable range of the aberration correction lens 41. With the configuration in the example of the related art in which the aberration correction lens 41 is supported on the leaf springs 45, however, a lens movement in the Y axis direction is no longer negligible when the movable range is widened. Furthermore, elastic strain energy of the leaf springs 45 is increased as the aberration correction lens 41 undergoes significant displacement. This raises a problem that holding power increases correspondingly. In short, there is a problem that the related art is substantially inadaptable to a multi-layer optical disk.

An object of the invention is therefore to provide an optical head being capable of holding the aberration correction lens without consuming power and having a satisfactory shock resistance and achieving accurate positioning.

In order to achieve the above and other objects, an optical head of the invention is an optical head that irradiates a flux of light from a laser light source onto an optical disk through an objective lens, including: a lens holder that holds an aberration correction lens in a space between the laser light source and the objective lens; a driving shaft that is disposed to extend in a direction parallel to an optical axis of the flux of light and guides the lens holder in the extended direction; a piezoelectric element that is provided at an end portion of the driving shaft and extends and contracts in a driving shaft direction in response to an applied voltage; and a position detection portion that detects a position of the aberration correction lens in the driving shaft direction, wherein it is configured in such a manner that the lens holder is moved relatively with respect to the driving shaft in the driving shaft direction by varying a change rate when the applied voltage to the piezoelectric element is increased and decreased.

In this optical head, when the driving shaft is oscillated in the axial direction by applying a voltage to the piezoelectric element, a displacement rate differs when the driving shaft undergoes displacement in one direction and when the driving shaft undergoes displacement in the other direction. Hence, when the displacement takes place at a high rate, sliding occurs between the driving shaft and the lens holder, while no sliding occurs between these two components when the displacement takes place at a low rate. It is thus possible to move the aberration correction lens gradually in the optical axis direction as the position of the lens holder with respect to the driving shaft changes gradually while the driving shaft repetitively oscillates. The aberration correction lens can be therefore positioned accurately in the optical axis direction. Moreover, it is sufficient to apply a voltage to the piezoelectric element only when the aberration correction lens is displaced, and no power is necessary when the aberration correction lens is allowed to stand still. Further, because the lens holder is supported on the driving shaft, it is possible to control the aberration correction lens not to undergo displacement in a direction other than the optical axis direction.

As has been described, according to the invention, the aberration correction lens can be fixed at any position on the driving shaft without consuming any power; moreover, accurate positioning is enabled. Further, the shock resistance can be enhanced.

BEST MODE FOR CARRYING OUT THE INVENTION

Hereinafter, the best mode for carrying out the invention will be described in detail with reference to the drawings.

First Embodiment

Figure 1:
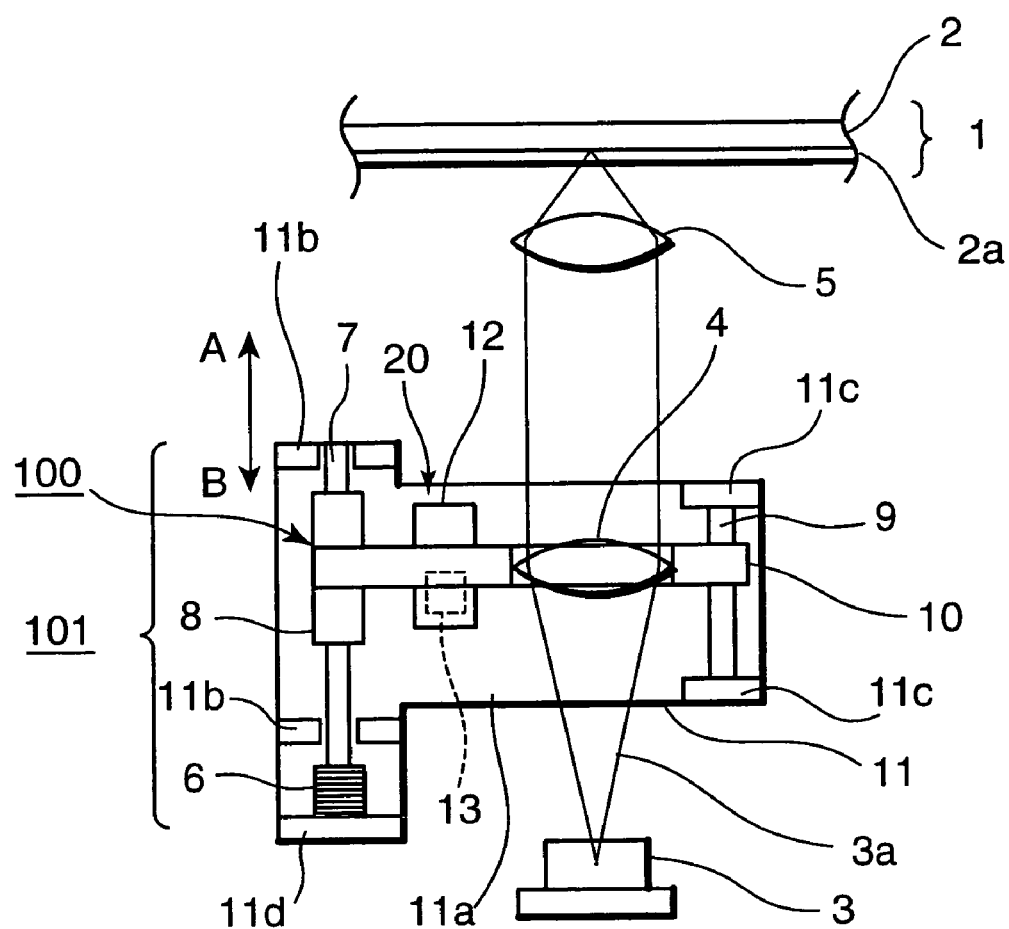
FIG. 1 is a view schematically showing a major portion of an optical head according to a first embodiment of the invention.
Figure 2:
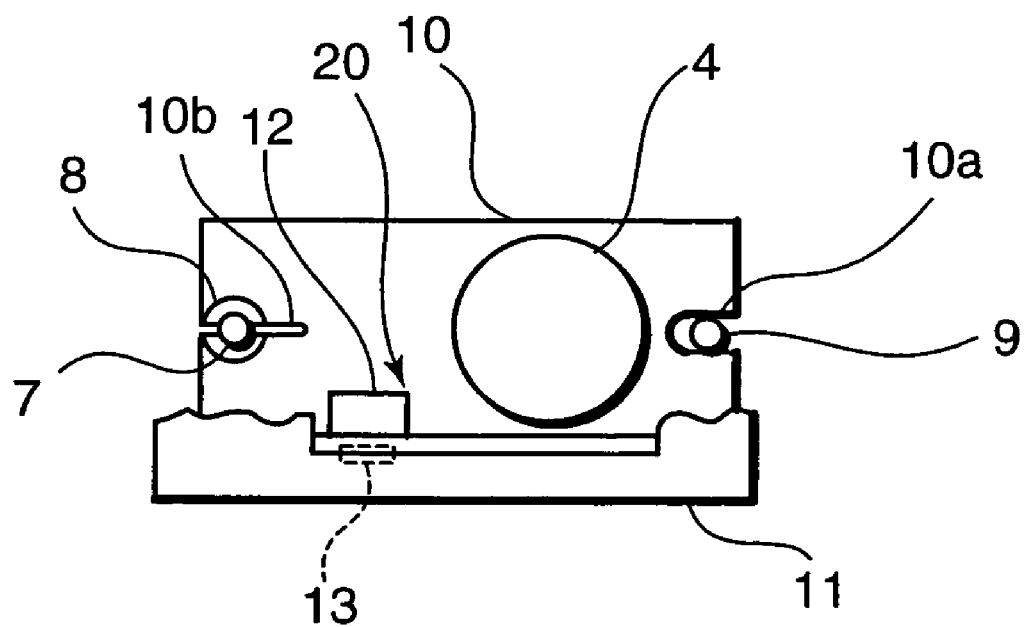
FIG. 2 is a side view of the optical head.

FIG. 1 and FIG. 2 are views schematically showing a major portion of a first embodiment of an optical head of the invention.

As is shown in FIG. 1 and FIG. 2, the optical head includes a laser light source 3, an aberration correction lens 4, and an objective lens 5. A laser beam 3a emitted from the laser light source 3 is irradiated onto an optical disk 1 used as a recording medium by passing through the aberration correction lens 4 and the objective lens 5. The optical disk 1 has at least a substrate 2, a cover layer 2a, and a recording layer (not shown) disposed between the substrate 2 and the cover layer 2a. The recording layer may be made of a phase change material, a magneto-optical material, or any other recording material.

The aberration correction lens 4 is supported on an aberration correction base 11. To be more concrete, the aberration correction base 11 includes a bottom portion 11a, a pair of first supporting portions 11b provided to stand on the bottom portion 11a, and a pair of second supporting portions 11c provided to stand on the bottom portion 11a. The bottom portion 11a is made into a flat plate in the shape of a capital T when viewed in a plane. The both first supporting portions 11b are disposed at one end (for example, the left end in FIG. 1) in a direction orthogonal to the optical axis of the laser beam 3a, and the both second supporting portions 11c are disposed at the other end (for example, the right end in FIG. 1) in the direction orthogonal to the optical axis.

The both first supporting portions 11b are provided to stand on the bottom portion 11a while being spaced apart in the optical direction. Each first supporting portion 11b is made into a shape of a flat plate disposed parallel to a direction orthogonal to the optical axis of the laser beam 3a. A fixing portion 11d is provided to stand on the bottom portion 11a of the aberration correction base 11 on the side opposing one of the first supporting portions 11b with the other first supporting portion 11b (the lower one in FIG. 1) in between. The fixing portion 11d is made into a shape of a flat plate disposed parallel to the first supporting portions 11b.

A piezoelectric element 6 is fixed to the fixing portion 11d. The piezoelectric element 6 is provided in such a manner that when a voltage is applied, it extends slightly in a direction A which is the driving direction in the drawing.

Each first supporting portion 11b is provided with a through hole for a drive shaft 7. These through holes are provided at positions to be parallel to the optical axis of the laser beam 3a. The drive shaft 7 inserted through these through holes is therefore disposed parallel to the optical axis.

One end of the drive shaft 7 protrudes from one of the first supporting portions 11b. The drive shaft 7 is formed in a cylindrical shape. The drive shaft 7, being supported on the both first supporting portions 11b, is held spaced-apart from the aberration correction base 11, and is thereby free to move in directions A and B shown in the drawing.

The second supporting portions 11c are fixed to the aberration correction base 11 while being spaced apart in the optical axis direction. Each second supporting portion 11c is made into a shape of a flat plate disposed almost parallel to a direction orthogonal to the optical axis of the laser beam 3a.

An auxiliary guiding shaft 9 is supported on the both second supporting portions 11c. The auxiliary guiding shaft 9 is disposed almost parallel to the optical axis of the laser beam 3a and at the same time it is held by the second supporting portions 11c so as not to move in the axial direction. The aberration correction lens 4 is positioned in a space between the auxiliary guiding shaft 9 and the drive shaft 7.

One end of the drive shaft 7 protruding from one of the first supporting portions 11b is fixed to the piezoelectric element 6. That is to say, the piezoelectric element 6 is used as means for providing acceleration to the drive shaft 7 to move in a direction parallel to the optical axis of the laser beam 3a.

A lens holder 10 is supported on the drive shaft 7 and the auxiliary guiding shaft 9. The aberration correction lens 4 is fixed to the lens holder 10. The lens holder 10 is made into a shape of a rectangular flat plate. An insert groove 10b is provided in the end portion of the lens holder 10 on the drive shaft 7 side, and a guiding groove 10a is provided in the end portion of the lens holder 10 on the auxiliary guiding shaft 9 side.

A cylindrical frictional holding body 8 is inserted immovably into the insert groove 10b in the lens holder 10. The drive shaft 7 is inserted through the frictional holding body 8. The frictional holding body 8 has a sufficient length to prevent the aberration correction lens 4 from tilting.

Figure 3:
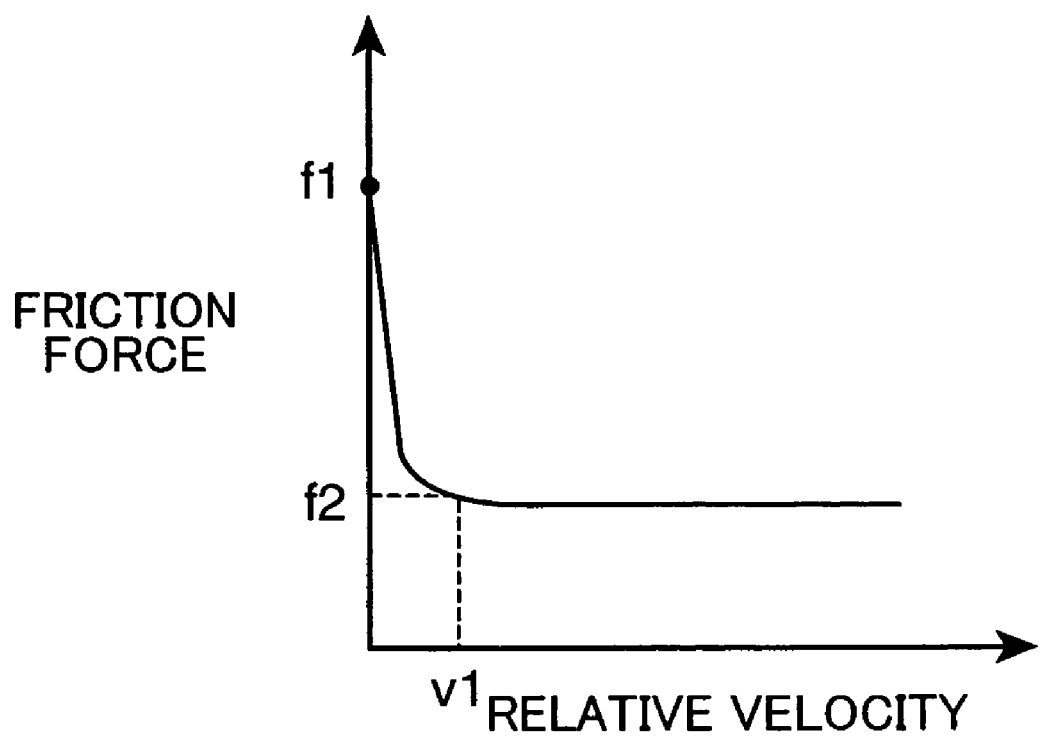
FIG. 3 is a characteristic view schematically showing a relation of a frictional force generated between a driving shaft and a frictional holding body provided in the optical head and a relative velocity of the driving shaft.

The frictional holding body 8 and the drive shaft 7 are frictionally coupled to each other. In other words, when an external force that is gradually increasing at or lower than the static friction force acts on the drive shaft 7 the frictional holding body 8 moves integrally with the drive shaft 7, since a friction force to some extent is exerted between the frictional holding body 8 and the drive shaft 7. Meanwhile, when the external force acting on the drive shaft 7 increases abruptly to the extent that the inertia force corresponding to the mass of a movable portion 100 described below exceeds the static friction force, sliding occurs between these two components, which causes the drive shaft 7 alone to move. For example, as is shown in FIG. 3, the static friction force f1 is exerted when a relative velocity between the drive shaft 7 and the frictional holding body 8 is lower than a specific rate v1. When the inertia force exceeds the static friction force f1, the relative velocity shifts to a dynamic frictional range at or higher than v1, and sliding occurs between these two components. A dynamic friction force f2 that is smaller than the static friction force f1 is thus exerted. Hence, by adjusting a manner in which a voltage is applied to the piezoelectric element 6 appropriately in response to a friction force exerted between the drive shaft 7 and the frictional holding body 8 and the mass of the movable portion 100, it is possible to make a switch between a sliding state in which the friction holding body 8 (lens holder 10) undergoes relative displacement with respect to the drive shaft 7 and an integral moving state in which the drive shaft 7 and the frictional holding body 8 (lens holder 10) move as one unit. By repeating the both states, it is possible to change the positional relation of the frictional holding body 8 (lens holder 10) with respect to the drive shaft 7.

It should be noted that there is no problem when the frictional holding member 8 is formed integrally with the lens holder 10.

The auxiliary guiding shaft 9 is inserted into the guiding groove 10a. The guiding groove 10a and the guiding shaft 9 come into contact with each other in a state where a friction force, which is sufficiently small in comparison with a friction force exerted between the frictional holding member 8 and the drive shaft 7, is exerted.

In the example shown in the drawing, the guiding groove 10a is formed by notching the end portion of the lens holder 10. Alternatively, a guiding hole comprising a through hole may be provided in the lens holder 10, so that the auxiliary guiding shaft 9 is inserted through the guiding hole.

The optical head is provided with a position detection portion 20 that detects the position of the aberration correction lens 4 in the optical axis direction. The position detection portion 20 includes a magnet 12 as an example of a magnetic field generation portion and a hall element 13 as an example of a magnetic field detection portion. The magnet 12 is disposed on the lens holder 10. Meanwhile, the hall element 13 is disposed on the bottom portion 11a of the aberration correction base 11 to face the magnet 12. As is shown in FIG. 2, the hall element 13 is disposed so as to slightly protrude from the top surface (inner surface) of the bottom portion 11a.

Figure 4:
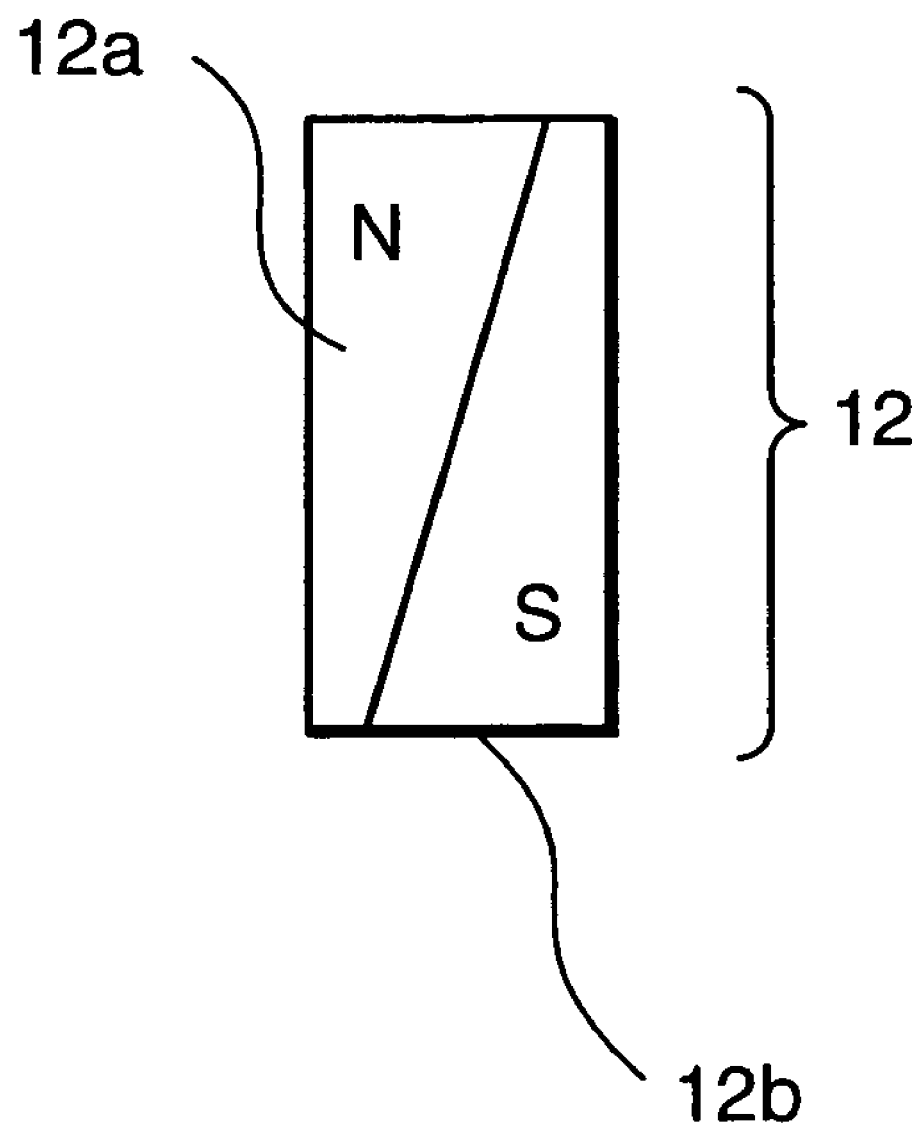
FIG. 4 is a view showing a magnet provided in the optical head.

As is shown in FIG. 4, the magnet 12 is formed in a shape of a rectangular prism, and comprises two wedge-shaped regions 12a and 12b partitioned at the boundary extending in a diagonal direction with respect to the length direction. Each of the regions 12a and 12b is polarized to a different polarity, and the axis of easy magnetization is set in a direction perpendicular to the sheet surface.

The hall element 13 is provided to improve the sensitivity for a magnetic field in a direction almost perpendicular to the bottom portion 11a (a direction almost perpendicular to the sheet surface of FIG. 1). Herein, assume that it is set so that a positive output is obtained when the hall element 13 is subjected to a downward magnetic field. In other words, assume that it is set so that a positive output is obtained when subjected to a magnetic field in a direction heading from the magnet 12 to the hall element 13 in FIG. 2.

Because the lens holder 10, the aberration correction lens 4 fixed to the lens holder 10, the frictional holding body 8, and the magnet 12 are all allowed to slide along the drive shaft 7 in a direction parallel to the optical axis, the lens holder 10, the aberration correction lens 4, the frictional holding body 8, and the magnet 12 are collectively defined as the movable portion 100 herein. In the optical axis direction, a direction to move approximate to the optical disk 1 is referred to as the direction A, and a direction to move away from the disk 1 is referred to as the direction B.

Because the lens holder 10 is supported on the two shafts, the drive shaft 7 and the auxiliary guiding shaft 9, which are parallel to each other, it is allowed to move in the optical axis direction without any oscillation in a direction rotating about the shafts.

Herein, a unit comprising a combination of the movable portion 100 and a driving portion that moves the movable portion 100 is defined as an aberration correction unit 101. The driving portion means a combination of the aberration correction base 11, the piezoelectric element 6, the drive shaft 7, the auxiliary guide shaft 9, and the hall element 13.

Hereinafter, operations of the optical head of the first embodiment configured as described above will be described.

A laser beam 3a emitted from the laser light source 3 passes through the aberration correction lens 4, and then forms an image on the recording layer by passing through the objective lens 5 and the cover layer 2a. In a case where the optical disk 1 causes side-runout or decentering in this instance, the object lens 5 moves two-dimensionally, and the position control is performed to follow such a movement.

During this operation, when a voltage is gradually applied to the piezoelectric element 6, the piezoelectric element 6 extends in a direction heading to A shown in FIG. 1. The drive shaft 7 thus starts to move gradually in the direction heading to A, and the frictional holding body 8 frictionally coupled to the drive shaft 7 also starts to move integrally with the drive shaft 7 in the direction heading to A. In this instance, because a friction force between the auxiliary guiding shaft 9 and the guiding groove 10a is sufficiently small, the movable portion 100 including the frictional holding body 8 moves gradually in the direction heading to A. The aberration correction lens 4 consequently moves in the direction heading to A while keeping its posture (integral moving state).

When a voltage that has been kept applied to the piezoelectric element 6 is abruptly stopped in this state, the piezoelectric element 6 contracts abruptly. The drive shaft 7 thus starts to move abruptly in a direction heading to B and returns to its original position. In this instance, a force that accelerates the movable portion 100 in the direction B is exerted. However, an inertia force corresponding to its mass also acts on the movable portion 100. Meanwhile, although the frictional holding body 8 and the drive shaft 7 are frictionally coupled to each other, when the inertial force exceeds the static friction force, sliding occurs between the drive shaft 7 and the frictional holding body 8. The relative velocity between these two components is therefore increased and it shifts to a dynamic frictional range having a relatively small friction force. As a result, the movable portion 100 including the aberration correction lens 4 remains at substantially the same place (sliding state) regardless of the fact that the drive shaft 7 is moving in the direction heading to B.

As a result of one cycle as a combination of the integral moving state and the sliding state, the aberration correction lens 4 has moved in the direction heading to A by a distance comparable to an extended length of the piezoelectric element 6. A quantity of extension of the piezoelectric element 6 is minute, and so is a quantity of movement of the aberration correction lens 4 per cycle. Hence, by repeating the cycle until a desired quantity of movement is achieved, it is possible to move the aberration correction lens 4 by an arbitrary quantity in the direction heading to A. This movement is achieved by repeating the cycle at a quantity of movement per cycle in the order of nanometer and at a high frequency in the order of some hundreds kHz.

On the other hand, when the aberration correction lens 4 is moved in the direction heading to B, the driving voltage to the piezoelectric element 6 is increased abruptly and then the driving voltage is reduced gradually. The movable portion 100 thus remains immovable when the drive shaft 7 moves abruptly in the direction heading to A, whereas it moves gradually when the drive shaft 7 moves in the direction heading to B. The movable portion 100 therefore moves in the direction heading to B. The aberration correction lens 4 consequently moves in the direction heading to B.

In a case where spherical aberration occurs due to an irregular thickness of the cover layer 2a, the spherical aberration can be corrected by changing an angle of incidence of a laser beam on the objective lens 5 by moving the aberration correction lens 4 in the optical axis direction by the method described above.

The drive shaft 7 does not bend like a blade spring, and a connection between the frictional holding body 8 and the aberration correction lens 4 is thought to be substantially rigid. The aberration correction lens 4 therefore will not oscillate due to the influences of disturbance-induced oscillations as in the example in the related art. Also, there is no need of the holding power to allow the aberration correction lens 4 to stand still so as not to undergo displacement as in the example in the related art. In other words, by frictionally coupling the frictional holding body 8 to the drive shaft 7, the lens holder 10 is able to hold the aberration correction lens 4 in a stable manner without a supply of power. It is thus possible to reduce power consumption.

An actual spherical aberration correction operation is performed by searching for the position of the aberration correction lens 4 at which a playback signal from the optical disk 1 becomes most appropriate. The most appropriate position of the aberration correction lens 4 differs in each disk 1 due to a thickness error of the cover layer 2a.

In the case of a disk having two or more layers, the position of the aberration correction lens 4 at which a signal becomes most appropriate is searched for each layer. In the case of a movement from layer to layer, it is advantageous in terms of saving a time to store the most appropriate position, so that the aberration correction lens 4 is moved to the most appropriate position without having to perform a search again. In the invention, a position signal necessary in this instance is obtained from the hall element 13 that outputs a signal corresponding to a magnetic field from the magnet 12.

The spherical aberration correction operation can be performed while the focus servo is applied on the optical disk 1 or the focus servo may be applied to the optical disk 1 after the spherical aberration is corrected.

A magnetic flux that passes by the hall element 13 when the magnet 12 having the wedge-shaped regions 12a and 12b as shown in FIG. 4 is used will now be described with reference to FIG. 5 and FIG. 6. The axis of easy magnetization is perpendicular to the sheet surface. FIG. 6A conceptually shows a magnetic flux in the magnet 12 taken along the cross section Y1 when viewed in a direction V shown in FIG. 5. Likewise, FIG. 6B shows a magnetic flux in the cross section Y2, and FIG. 6C shows a magnetic flux in the cross section Y3. As is shown in FIG. 6A, the hall element 13 is chiefly subjected to an upward magnetic field within a plane including the cross section Y1. Also, as is shown in FIG. 6B, it is chiefly subjected to a lateral magnetic field within a plane including the cross section Y2. In addition, as is shown in FIG. 6C, it is chiefly subjected to a downward magnetic field within a plane including the cross section Y3.

Figure 7:
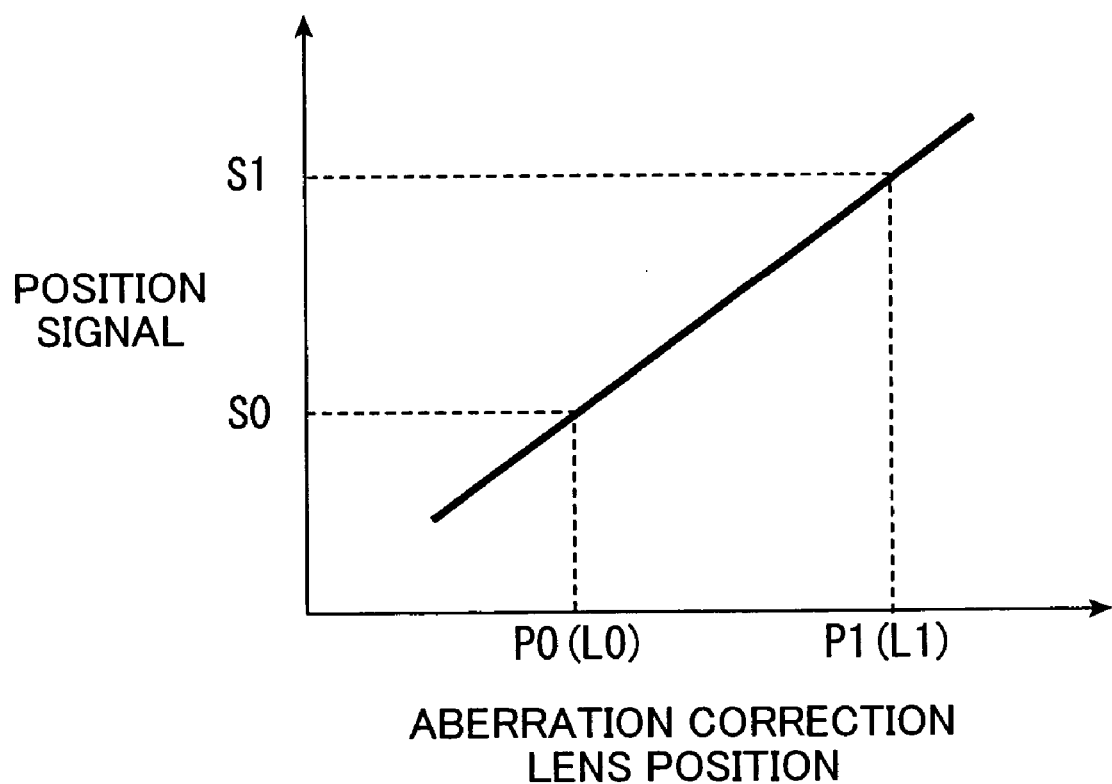
FIG. 7 is a characteristic view showing a relation of the position of an aberration correction lens in the optical axis direction and a position signal.

Hence, when the aberration correction lens 4 moves in the optical axis direction, the magnetic field to which the hall element 13 is subjected changes continuously from an upward magnetic flux in the cross section Y1 to the downward magnetic flux in the cross section Y3. The position signal based on an output from the hall element 13 thus shapes a continuous, almost straight line as is shown in FIG. 7. This position signal is a signal after the differential amplification or quantization.

Let P0 and P1 be the most appropriate positions of the aberration correction lens 4 with respect to recording layers L0 and L1, respectively, in a double-layer disk. Let S0 and S1 be position signals specifying the positions of the aberration correction lens with respect to the positions P0 and P1, respectively, of the aberration correction lens 4. The position signal can be obtained from an output signal of the hall element 13. Herein, assume that the values S0 and S1 of the position signal have been stored.

Assume that the aberration correction lens 4 is present at the position P0 corresponding to the recording layer L0. When there is a need to make an access to the recording layer L1, the stored position signal S1 is compared with the current position signal S0. Then, by moving the aberration correction lens 4 by repeating the cycle described above until the position signal reaches S1, it is possible to move the aberration correction lens 4 to the position P1 corresponding to the recording layer L1. When returning to the recording layer L0, the procedure is performed inversely.

In a case where the optical disk 1 has multiple recording layers and the aberration correction lens 4 has to be moved markedly, a relatively large movable distance can be readily secured because the aberration correction lens 4 can be moved by a distance as long as the drive shaft 7 in this embodiment. Also, unlike the example in the related art, the lens offset or power will not be increased depending on the amplitude, and this embodiment is readily adaptable to a multi-layer optical disk.

An S/N ratio can be increased when the hall element 13 is placed as close as possible to the magnet 12. However, when the magnet 12 comes too close to the aberration correction base 11, there is a risk of a collision. Hence, by taking an error into account on the design, it is preferable that a distance to some extent is secured between the magnet 12 and the aberration correction base 11, and the hall element 13 alone or the hall element 13 together with an accompanying fixing mechanism alone is approximated to the position of the magnet 12. For example, it is sufficient to cause the hall element 13 to slightly protrude from the principal surface in the bottom portion 11a of the aberration correction base 11.

For example, zinc or the like can be chosen as a material of the frictional holding body 8, including a case where it is formed integrally with the lens holder 10; however, resin can be used as well. An effect of improving the abrasion resistance of the frictional holding body 8 can be expected by using a resin material having a self-lubricating property, such as PTFE (fluorine-based resin). Moreover, because the need to apply a lubricant agent is eliminated, there occurs no event that the lubricant agent flies over onto the optical system. In addition, the frictional holding body 8, including a case where it is formed integrally with the lens holder 10, may be made of a resin material containing a fluorine-based compound.

The first embodiment is of the configuration in which the hall element 13 is disposed on the aberration correction base 11 and the magnet 12 is disposed on the movable portion 100 side. However, they can be disposed in an opposite manner. It should be noted, however, that the configuration to dispose the magnet 12 on the movable portion 100 side is advantageous, because no wiring is necessary.

The summary of the first embodiment is set forth as follows.

(1) As has been described, a voltage that gives a rise to a change causing the drive shaft to slide with respect to the lens holder and a voltage that gives a rise to a change causing the drive shaft to move integrally with the lens holder are repetitively applied to the piezoelectric element.

(2) The position detection portion includes the magnetic field generation portion and the magnetic field detection portion disposed in such a manner that it is allowed to undergo displacement in the optical direction with respect to the magnetic field generation portion.

(3) The drive shaft is supported on the base having the bottom portion, and the magnetic field detection portion is disposed to protrude from the bottom portion of the base.

(4) The lens holder comes into contact with the drive shaft via the frictional holding body.

(5) The lens holder is made of a resin material containing a fluorine-based compound or fluorine-based resin.

(6) The aberration correction lens corrects spherical aberration.

Second Embodiment

Figure 8:
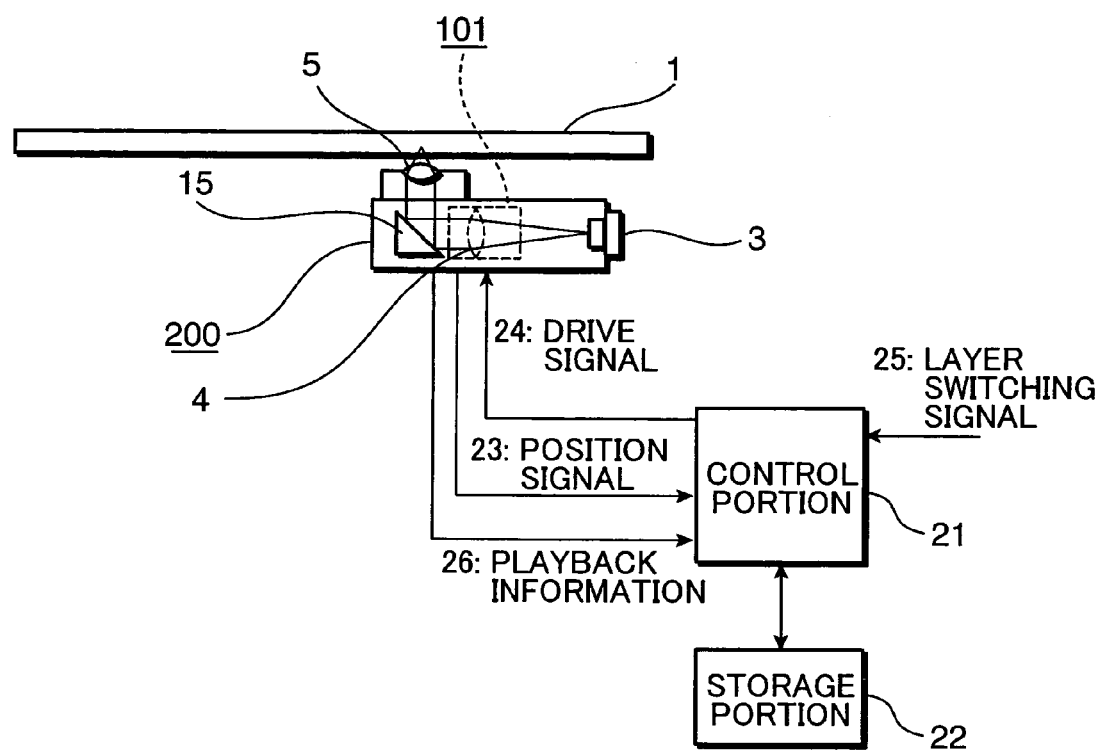
FIG. 8 is a view schematically showing a major portion of an optical disk device according to a second embodiment of the invention.

FIG. 8 is a view schematically showing a major portion of an optical disk device according to a second embodiment of the invention. An optical head 200 in this optical disk device includes an aberration correction unit 101. The aberration correction unit 101 is the aberration correction unit described in the first embodiment, and includes the aberration correction lens 4. In the optical head 200, a mirror 15 is provided in a space between the aberration correction lens 4 and the objective lens 5. The mirror 15 reflects a laser beam having passed through the aberration correction lens 4 after it is emitted from the laser light source 3 in a direction almost parallel to the optical disk 1. The laser beam reflected on the mirror 15 passes through the objective lens 5 with its optical axis being set in a direction almost perpendicular to the optical disk 1, and is then irradiated onto the optical disk 1.

Herein, assume that the optical disk 1 is an information recording medium having two recording layers. In short, it has a recording layer L0 and a recording layer L1. Also, assume that the optical disk 1 is provided with an identifier unique to the disk. The configuration of the optical head 200 is basically the same as the first embodiment except that the mirror 15 is provided.

The optical disk device includes a control portion 21 and a storage portion 22. The control portion 21 controls a layer switching signal 25, a position signal 23 from the optical head 200, and a drive signal 24 for the piezoelectric element 6 according to information from the storage portion 22. The position signal 23 is the same as the position signal described in the first embodiment. The control portion 21 extracts necessary information from playback information 26 and store the extracted information into the storage portion 22.

Operations of the optical disk device according to the second embodiment configured as described above will now be described.

A case where the identifier of the disk has not been stored in the storage portion 22 will be described first.

When the optical disk 1 is loaded into the optical disk device and is brought into a playback enabled state, the optical head 200 first tries to play back the identifier of the disk, and delivers the information thus read to the control portion 21 as the playback information 26. The disk identifier can be read out satisfactorily even in the presence of spherical aberration or the like. The control portion 21 searches through the storage portion 22 for the disk identifier, and controls the storage portion 22 to store the disk identifier when it has not been stored.

Subsequently, the control portion 21 controls the drive signal 24 for the piezoelectric element 6 while confirming the playback information 26, so that the aberration correction lens 4 comes to the most appropriate position for playing back the information recorded in the recording layer L0. The aberration correction lens 4 thus moves to the target position.

There are various methods for finding the most appropriate position of the aberration correction lens 4 with respect to the recording layer L0. For example, a method by which the aberration correction lens 4 is moved gradually and a position at which the jitter of the playback information 26 reaches the minimum is found to the most appropriate position of the aberration correction lens 4, a method by which a position at which the amplitude of a tracking error signal reaches the maximum in the absence of the tracking servo is found to be the most appropriate position of the aberration correction lens 4, etc. are possible. After the most appropriate position of the objective lens 5 with respect to the recording layer L0 is found by the focus control and the tracking control, the layer is identified as the recording layer L0 by reading out the recording layer identifier or the identifying signal pre-recorded in the recording layer L0.

The most adequate value of the position signal 23 with respect to the recording layer L0 is extracted as S0 in this manner, and stored in the storage portion 22. The most adequate value S1 of the position signal 23 with respect to the recording layer L1 can be stored into the storage portion 22 in the same procedure. A table of the most appropriate position signals 23 for the aberration correction lens 4 using individual disk identifiers as the indices can be thus created in the storage portion 22.

In a case where the identifier of the recording layer is not used, the table of the position signals may be created by searching for the recording layers sequentially from one end in the thickness direction of the disk 1 used as a recording medium, and storing the value of the position signal 23 at a position at which the recording layer is detected in the storage portion 22 in order of detection.

In a case where information is recorded into or information is played back from the optical disk 1, for example, in a case where recording and playback is performed using the recording layer L0, an L0 layer switching command is provided to the layer switching signal 25. The control portion 21 then takes out the most appropriate signal S0 corresponding to the recording layer L0 from the position signal table in the storage portion 22, and controls the drive signal 24 of the piezoelectric element 6 while making a comparison with the current position signal 23. The aberration correction lens 4 is thus moved by changing the drive signal 24 until the position signal reaches almost S0.

A case where information about the disk identifier of the optical disk 1 has been stored in the storage portion 22 will now be described.

When the optical disk 1 is brought into a playback enabled state, the disk identifier is played back and delivered to the control portion 21 as playback information. The control portion 21 then reads out the position signals corresponding to the recording layer L0 and the recording layer L1 as S0 and S1, respectively, from the storage portion 22 according to the disk identifier.

In a case where the layer switching signal 25 includes the L0 layer switching command, the control portion 21 extracts the most appropriate position signal S0 corresponding to the recording layer L0 from the storage portion 22, and controls the drive signal 24 of the piezoelectric element 6 by making a comparison with the current position signal 23, so that the aberration correction lens 4 is moved until the position signal reaches almost S0.

When the layer switching is performed, by storing the most appropriate signal positions S0 and S1 into the storage portion 22 in this manner, the need to perform a search more than once is eliminated. The layer switching at a high speed is thus enabled.

Also, by storing the disk identifier and the position signal into the storage portion 22 in this manner, for the optical disk that has been played back once, playback and recording of information are enabled immediately on the basis of the information stored in the storage portion 22 without having to perform a search again.

There may be an optical disk having no disk identifier. In such a case, however, S0 and S1 are searched for each time the disk is loaded, and a problem will not occur particularly.

In a case where the optical disk 1 has three or more recording layers, this embodiment is applicable by making an appropriate change.

The summary of the second embodiment is set forth as follows.

(1) As has been described, the second embodiment includes the optical head and the control portion that adjusts an applied voltage to the piezoelectric element according to the detection result on the optical head by the position detection portion.

(2) The control portion is configured to be capable of acquiring disk identification information provided to the optical disk, and the storage portion that stores the set position of the aberration correction lens corresponding to the disk identification information is provided.

Third Embodiment

Figure 9:
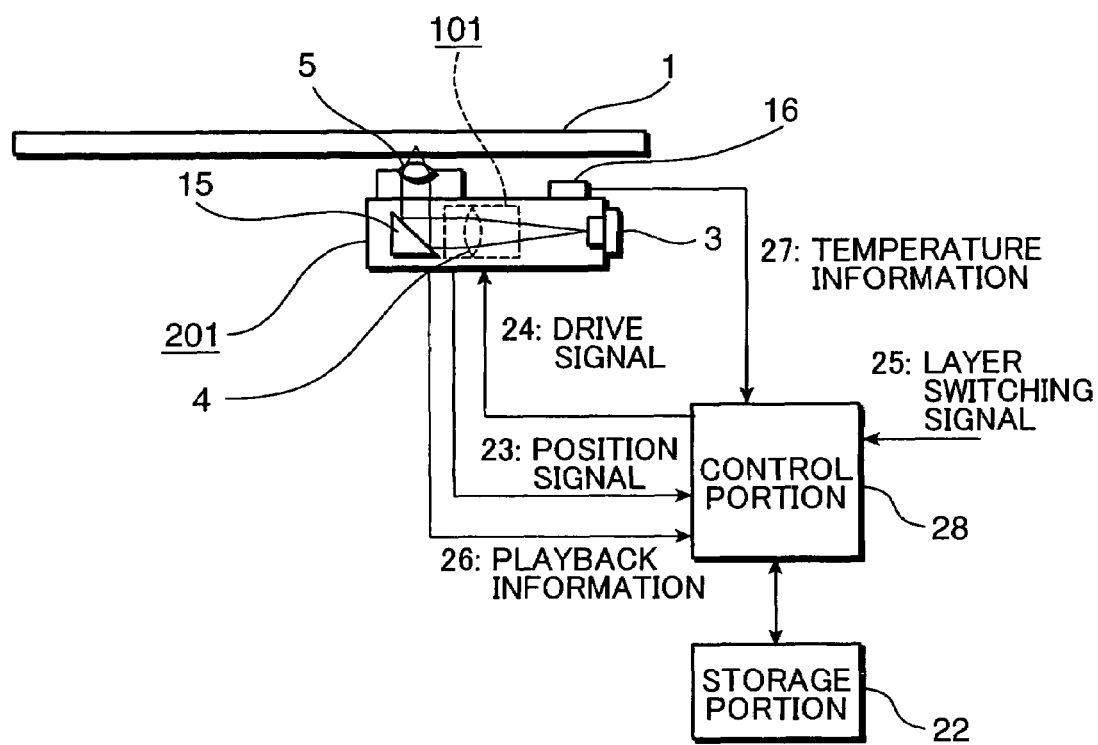
FIG. 9 is a view schematically showing a major portion of an optical disk device according to a third embodiment of the invention.

FIG. 9 is a view schematically showing a major portion of an optical disk device according to a third embodiment of the invention. This embodiment is different from the second embodiment in that a temperature sensor 16 is provided to the optical head 201, and that an output of the temperature sensor 16 is inputted into a control portion 28 as temperature information 27. The rest of the configuration is the same as the second embodiment.

Figure 10:
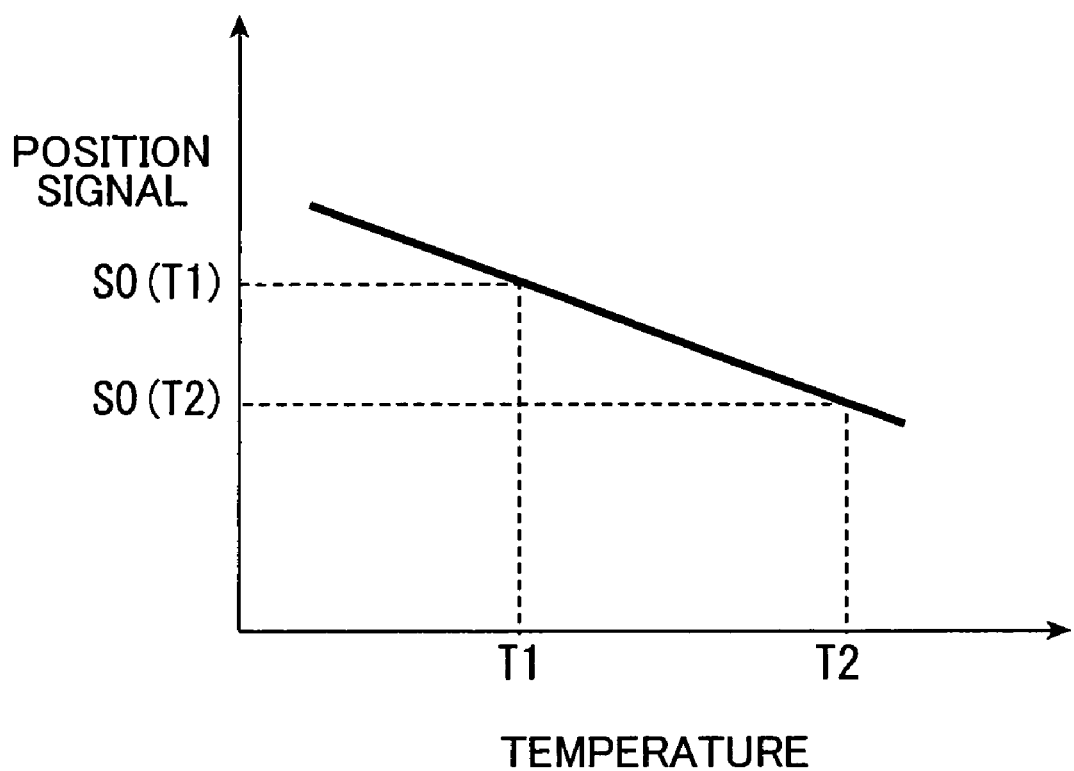
FIG. 10 is a characteristic view showing a temperature change of the position signal.

The characteristics of the hall element 13 and the magnet 12 described in the first embodiment vary with temperature. For example, as is shown in FIG. 10, even when the aberration correction lens 4 is set at the same position, the position signal generated on the basis of an output from the hall element 13 decreases almost linearly as the temperature increases. However, because the temperature coefficient is almost constant, it is possible to perform accurate control by taking this property into account.

Operations of the optical disk device of the third embodiment configured as described above will now be described.

Descriptions of the basic operations are omitted because they are the same as the second embodiment. In the third embodiment, the storage portion 22 has stored the position signals S0 and S1 corresponding to the respective recording layers and temperatures detected by the temperature sensor 16 at the time of the searches for the most appropriate position as the temperature information 27. Also, upon acquisition of the identification information of the disk, this identification information is stored as well.

In a case where the identification information of the disk has not been stored in the storage portion 22, the control portion 28 records the following into the storage portion 22: the identification information of the optical disk and the position signals S0 and S1 at which the aberration correction lens 4 reached the most appropriate position, plus the temperatures when the appropriate positions were searched as the temperature information 27. The control portion 28 monitors the temperature each time the most appropriate position is searched for, and corrects the position signals S0 and S1 on the basis of a difference between the temperatures at the time of the searches stored in the storage portion 22 and the current temperature as well as the temperature coefficient.

This correction can be made in the same manner as a correction of the temperature coefficient for resistance. For example, in a case where the position signal S0 is searched for under the condition of the temperature T1, when the position signal S0 at the temperature T2 needs to be calculated, then an equation as follows can be used:

$$S0(T2)=S0(T1)\times(1+\alpha(T2-T1))$$

where α is a temperature coefficient that has an almost constant value. This value can be readily found empirically.

In a case where the disk identification information has been stored in the storage portion 22, the control portion 28 takes out the position signals S0 and S1 specifying the corresponding most appropriate positions of the disk and the temperatures at the time of the searches from the storage portion 22 on the basis of the disk identification information. In this case, it is also possible to set the most appropriate position of the aberration correction lens 4 by calculating the target position at the current temperature by performing the temperature correction in the same manner as above.

As has been described, according to the third embodiment, it is possible to perform more precise recoding and playback because the temperature compensation for the spherical aberration can be performed by a simple computation.

The summary of the third embodiment is set forth as follows.

(1) The temperature sensor that detects the temperature of the optical head is provided.

(2) The optical head and the control portion that adjusts an applied voltage to the piezoelectric element according to the detection result on the optical head by the position detection portion are provided, and the control portion is configured to correct the set position of the aberration correction lens on the basis of the temperature detected by the temperature sensor.

As in the second embodiment, more than one hall element 13 may be disposed in the drive shaft direction in the third embodiment, too.

Fourth Embodiment

Figure 11:
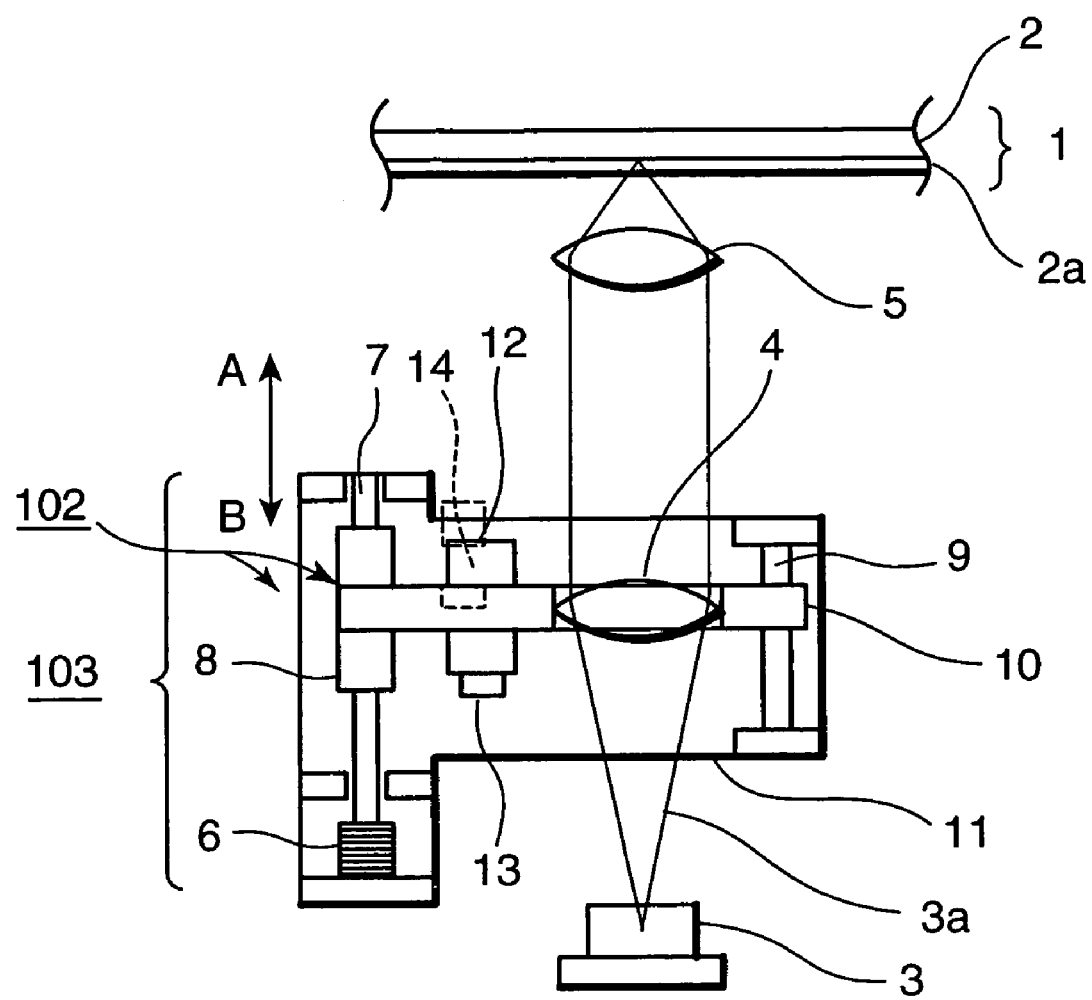
FIG. 11 is a view schematically showing a major portion of an optical head according to a fourth embodiment of the invention.

FIG. 11 is a view showing a major portion of an optical head according to a fourth embodiment of the invention. The optical head includes the hall element 13 as a first magnetic field detection portion and a hall element 14 as a second magnetic field detection portion. The rest of the configuration is the same as the first embodiment.

The hall element 14 and the hall element 13 comprise hall elements of the same type. These two hall elements 13 and 14 are disposed side by side in the moving direction of the aberration correction lens 4 while being spaced apart from each other.

Figure 12:
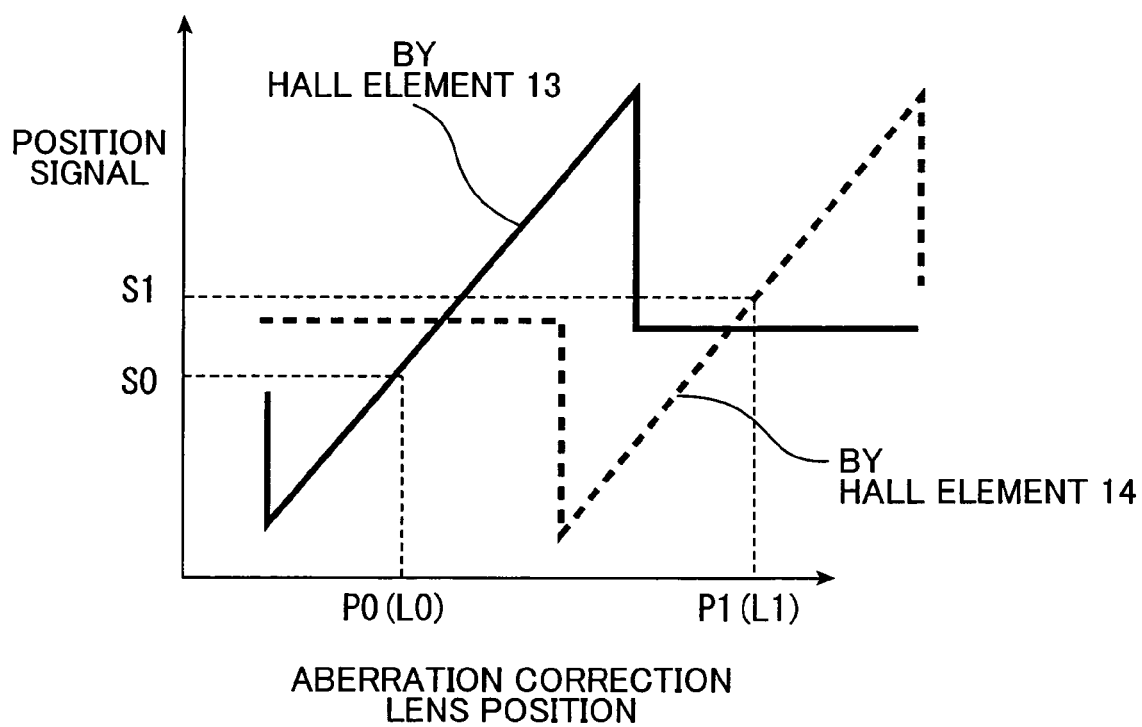
FIG. 12 is a characteristic view showing a change of the position signal of the optical head caused by the position of the aberration correction lens in the optical axis direction.

An example of the position signals outputted from the respective hall elements 13 and 14 is shown in FIG. 12. In the drawing, the position signal from the hall element 13 is indicated by a solid line and the one from the hall element 14 is indicated by a dotted line. As is shown in the drawing, by providing plural hall elements 13 and 14, it is possible to cover the entire movable range of the aberration correction lens 4. The spatial resolution can be therefore enhanced.

Although detailed operations by this configuration are omitted herein, when an optical layer having two recording layers is used, it is possible to set a center region generally having a satisfactory linearity in the position signal from each hall element to correspond to the position of each recording layer. For example, the position control of the aberration correction lens 4 is performed according to the position signal from the hall element 13 when an access is made to the first recording layer L0, and according to the position signal from the hall element 14 when an access is made to the second recording layer L1.

The summary of the fourth embodiment can be described that more than magnetic field detection portion is provided and aligned in the drive shaft direction.

As in the second embodiment, it may be configured in such a manner that more than one hall element 13 is provided in the drive shaft direction in the fourth embodiment, too.

Fifth Embodiment

Figure 13:
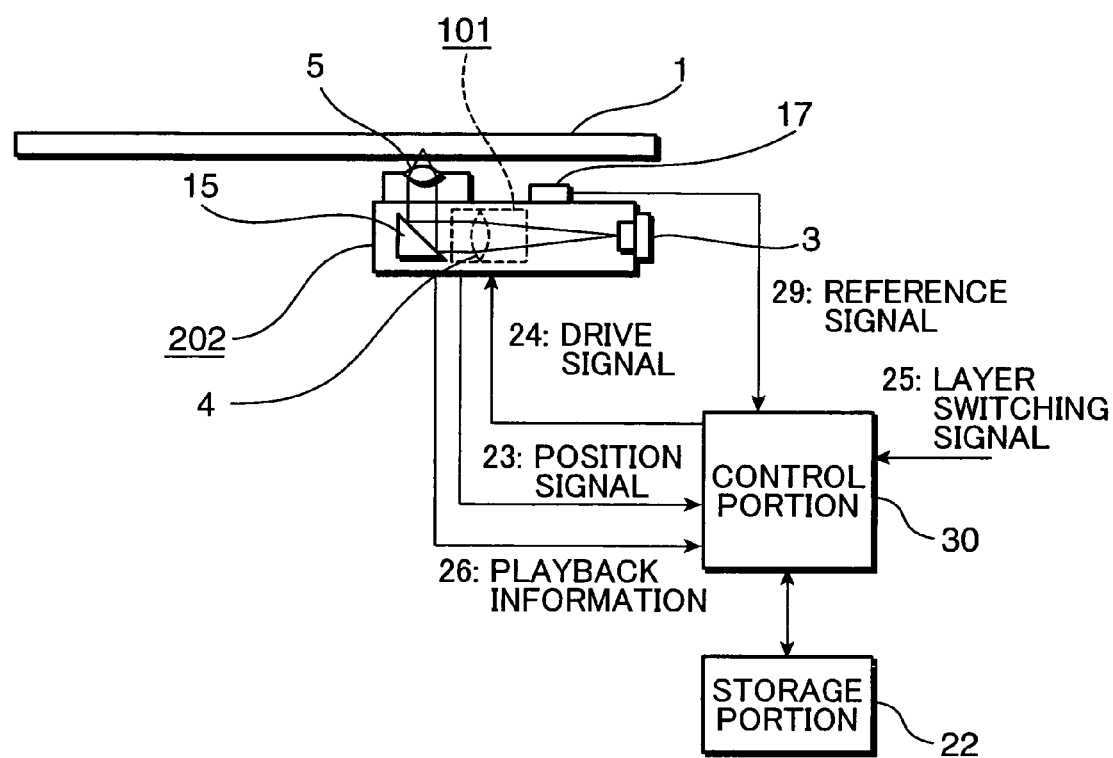
FIG. 13 is a view schematically showing a major portion of an optical disk device according to a fifth embodiment of the invention.

FIG. 13 is view schematically showing a major portion of an optical disk device according to a fifth embodiment of the invention. Besides the hall element 13 mounted on the aberration correction unit 101, a hall element 17 as an example of a correction magnetic field detection portion is mounted on an optical head 202 in the optical disk device. The rest of the configuration is almost the same as the second embodiment.

The hall element 17 and the hall element 13 comprise hall elements of the same type. The hall element 17 is disposed so that the orientation of the magnetic flux sensitivity becomes almost the same as that of the hall element 13. An output from the hall element 17 is inputted into a control portion 30 as a reference signal 29.

When a hall element is subjected to influences of an external magnetic field, generally, its characteristic changes with temperature or the like. The influences of an external magnetic field or the like to which is subjected the hall element 17 that is irrespective of the position signal are equivalent to the influences of an external magnetic field or the like to which is subjected the hall element 13 that outputs the position signal. Hence, by providing the hall element 17, it is possible to detect these influences alone at the hall element 17. Also, by performing a computation to correct the position signal from the hall element 13 using the reference signal 29 from the hall element 17 in the control portion 30, it is possible to reduce the influences of an external magnetic field, the temperature characteristic, etc. In addition, by providing the hall element 17, it is possible to reduce the influences even in a transitional state in which the temperature changes abruptly like at the moment immediately after the power supply is switched ON.

Another configuration may be adopted instead of the configuration in which the hall element 17 is mounted on the optical head 202. For example, by incorporating the hall element 17 in an output correction circuit of the hall element 13 using an operational amplifier, it is possible to achieve the configuration in which an automatically corrected position signal is inputted into the control portion 30. In this case, it is necessary to incorporate the hall element 17 so that the influences of an external magnetic field and the temperature characteristic to an output will have the polarity opposite to the polarity of the influences to the hall element 13. When configured in this manner, the need to correct the position signal in the control portion 30 can be eliminated.

The summary of the fifth embodiment is set forth as follows.

(1) In this embodiment, the correction magnetic field detection portion is provided at a position unsusceptible to the magnetic field developed by the magnetic field generation portion in such a manner that the direction of the magnetic field sensitivity is aligned with that of the magnetic field detection portion.

(2) The optical head and the control portion that adjusts an applied voltage to the piezoelectric element according to the detection result on the optical head by the position detection portion are provided, and the control portion is configured to correct the set position of the aberration correction lens according to the detection result on the optical head by the correction magnetic field detection portion.

As in the second embodiment, more than one hall element 13 can be disposed in the drive shaft direction in the fifth embodiment, too.

Sixth Embodiment

Figure 14:
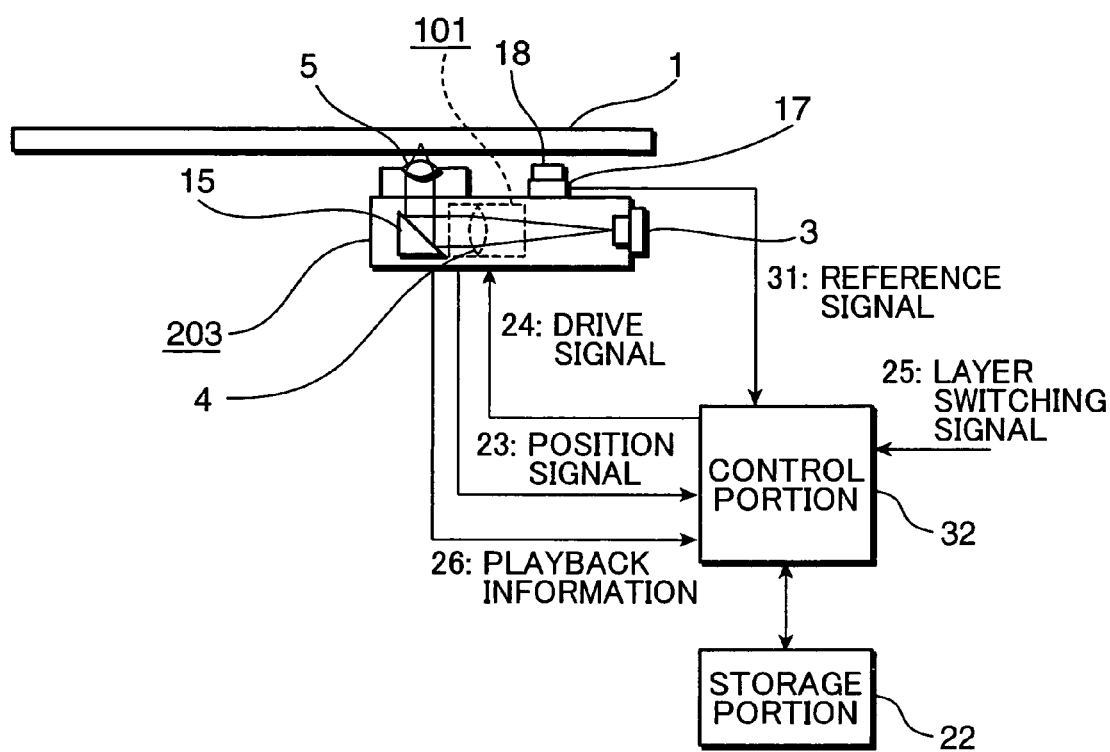
FIG. 14 is a view schematically showing a major portion of an optical disk device according to a sixth embodiment of the invention.

FIG. 14 is a view schematically showing a major portion of an optical disk device according to a sixth embodiment of the invention. An optical head 203 is different from the counterpart in the fifth embodiment in that a magnet 18 as an example of a correction magnetic field generation portion is provided. The rest, including a reference signal 31 and a control portion 32, are the same as the counterparts in the fifth embodiment.

The magnet 18 is different from the magnet 12 in the aberration correction unit 101 provided to the movable lens holder 10 in that it is fixed to the optical head 203. Both of the magnets 12 and 18, however, are common in that they are made of the same material.

In the sixth embodiment, in addition to a reduction of the influences of an external magnetic field, the temperature characteristic, a transitional response, etc., a correction of the operating characteristic of the hall element 13 including the temperature characteristic of the magnet 12 under the actual magnetic field is enabled. In the control portion 32, it is thus possible to correct an output signal from the hall element 13 in the aberration correction unit 101 in response to a change of an output of the hall element 17. For example, because the influences of a gain fluctuation or the like caused by a temperature change appear more apparently than in the fifth embodiment, more precise correction is enabled.

For example, let V11 and V12 be outputs of the hall element 13 and 17, respectively, at the position PO corresponding to the recording layer L0 at a given reference temperature T1. Let V21 and V22 be outputs of the hall element 13 and 17, respectively, at the position PO corresponding to the recording layer L0 at a given temperature T2. Then, because a rate of the gain fluctuation is the same for both the hall elements 13 and 17, we get V21/V11=V22/V12.

Initially, the outputs of the hall elements 13 and 17 at the position PO corresponding to the recording layer L0 at the temperature T1 are stored as V11 and V12, respectively. When the movable portion 100 moves due to a disturbance or the like after the temperature reaches T2, the hall element 13 is subjected to the influences of a change of the magnetic field caused by a displacement of the magnet 12 and the influences of a temperature change. Meanwhile, because the hall element 17 is subjected to the influences of a temperature change alone, it is possible to observe V22.

Suppose the hall element 13 is subjected to the influences of the temperature alone at the position PO corresponding to the recording layer L0, then the output V21 can be predicted as V21=V11×(V22/V12). Hence, by adjusting the position of the aberration correction lens 4 so that an output of the hall element 13 reaches V21, the influences of temperature can be reduced. It is thus possible move the aberration correction lens 4 to the position PO corresponding to the recording layer L0 more precisely.

The configuration of the sixth embodiment enables a correction of the position signal including the influences of the temperature characteristic of the magnet 12. In other words, even when the characteristic of the magnet 12 varies with temperatures, it is possible to reduce the influences. In addition, because the magnet 18 provides the hall element 17 with the magnetic field intensity almost equal to average magnetic field intensity close to the intensity of the magnetic field provided to the hall element 13 from the magnet 12, it is possible to correct a change of the sensitivity characteristic of the hall element 13 with temperatures at this magnetic field intensity.

The summary of the sixth embodiment can be described that the correction magnetic field generation portion is provided adjacently to the correction magnetic field detection portion.

As in the second embodiment, more than one hall element 13 can be disposed in the drive shaft direction in the sixth embodiment, too.

Seventh Embodiment

Figure 15:
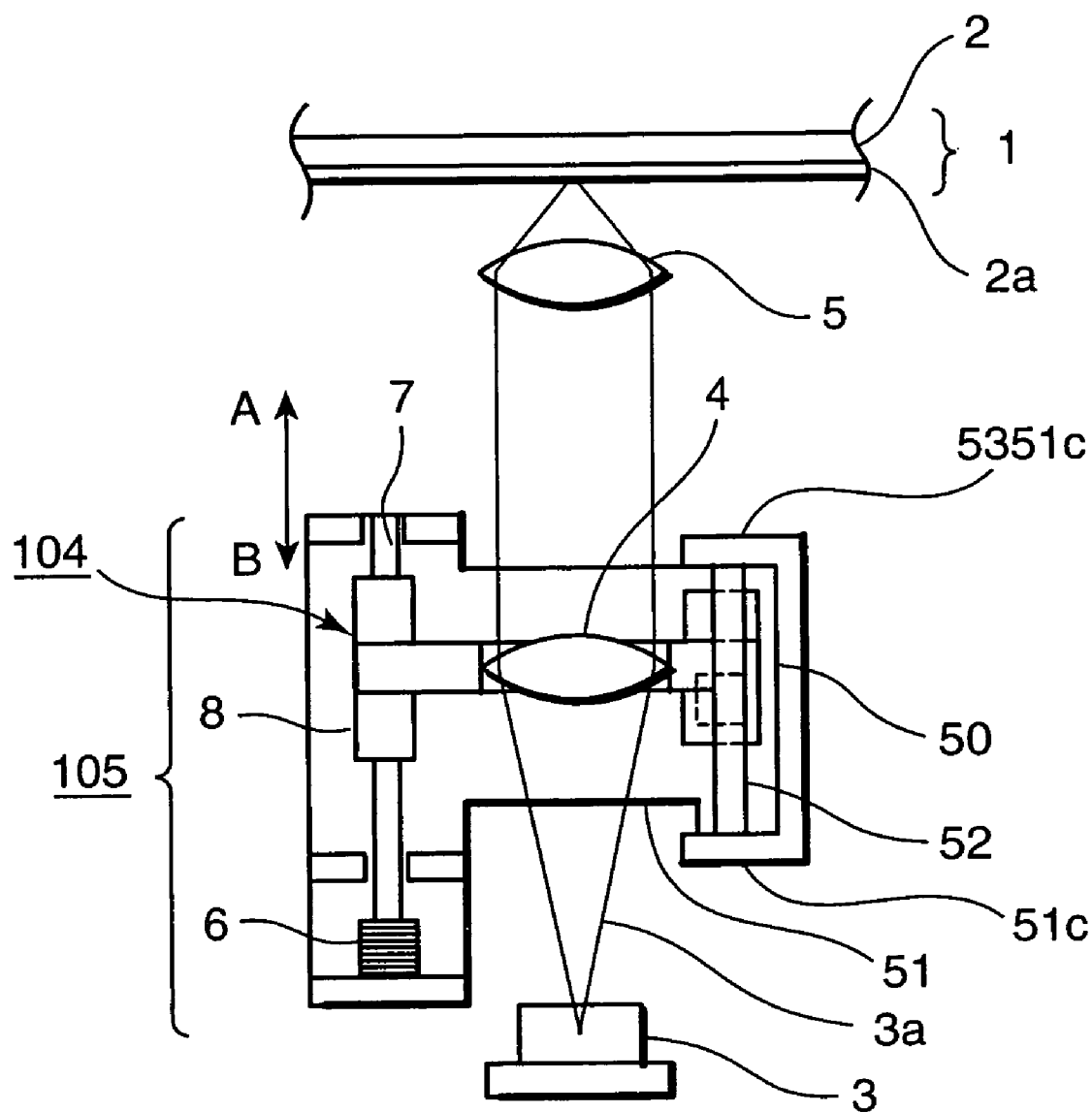
FIG. 15 is a view schematically showing a major portion of an optical head according to a seventh embodiment of the invention.
Figure 16:
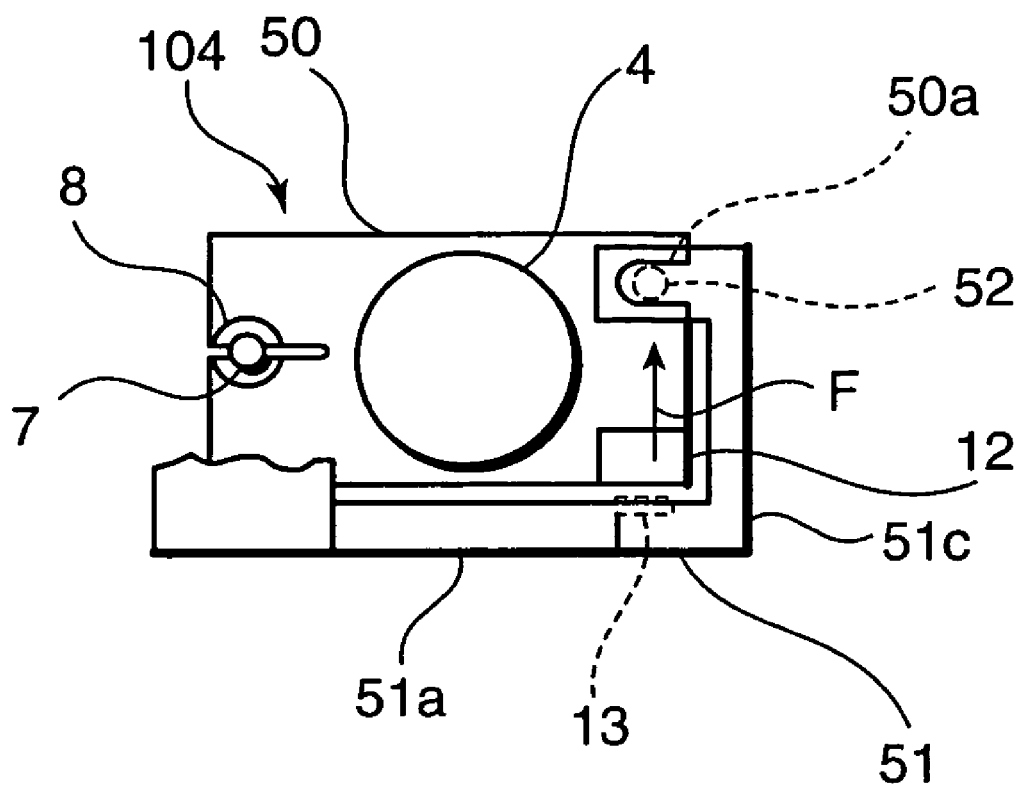
FIG. 16 is a side view of the optical head.

FIG. 15 and FIG. 16 are views schematically showing a major portion of an optical head according to a seventh embodiment of the invention.

The optical disk 1, the laser light source 3, the objective lens 5, the aberration correction lens 4, the drive shaft 7, the frictional holding body 8, the piezoelectric element 6, the magnet 12, and the hall element 13 are configured in the same manner as the respective counterparts in the first embodiment. A lens holder 50, a guiding groove 50a, an aberration correction base 51, a bottom portion 51a, and second supporting portions 51c function in the same manner as the respective counterparts in the first embodiment.

An auxiliary guiding shaft 52 is made of a soft magnetic body. The lens holder 50, the aberration correction lens 4, the magnet 12, and the frictional holding body 8 together constitute a movable portion 104.

The magnet 12 is disposed directly below the guiding groove 50a in FIG. 16. In other words, a direction heading from the magnet 12 to the auxiliary guiding shaft 52 is a direction almost perpendicular to a direction of the drive shaft 7. The magnet 12 and the auxiliary guiding shaft 52 are disposed on the same circumference about the drive shaft 7 to almost coincide with each other.

Because the auxiliary guiding shaft 52 is made of a soft magnetic body, it is attracted toward the magnet 12. Hence, as is shown in FIG. 16, the lens holder 50 is subjected to an upward force F in the drawing. The movable portion 104 thus starts to rotate in the counterclockwise direction of FIG. 16 about the drive shaft 7, which brings the guiding groove 50a and the auxiliary guiding shaft 52 into contact with each other.

Generally, when the aberration correction lens 4 moves abruptly, a light spot may be displaced on the optical disk 1, the servo becomes instable, and so forth. It is therefore preferable to reduce the backlash associated with a clearance of the guiding groove 50a and the guiding shaft 52 to the least possible level. However, when the clearance is made too small, double friction restriction, that is, friction restriction by the guiding groove 50a and the guiding shaft 52 and friction restriction by the drive shaft 7 and the frictional holding body 8, may possibly occur. This takes place when the guiding groove 50a has a finite width and the drive shaft 7 and the auxiliary guiding shaft 52 have a skew positional relation. No mechanism is able to reduce an error of such a positional relation to 0, and when the clearance between the guiding groove 50a and the auxiliary guiding shaft 52 is made too small, it may cause a malfunction as the aberration correction unit. Normally, a clearance to some extent is secured and a pressure bar spring or the like is used to remove the backlash.

In the seventh embodiment, the backlash is prevented using a force F induced by the magnet 12 that is used to detect the position of the aberration correction lens 4. Hence, in this embodiment, it is possible to remove an instability, such as the backlash associated with a clearance between the auxiliary guiding shaft 52 and the guiding groove 50a using the attraction force F of the magnet 12 alone without having to add any new component. It should be noted that because the hall element 13 is present on the opposite side of the auxiliary guiding shaft 52, the attraction-induced change of the magnetic field gives little influences to the position signal.

The configuration of the seventh embodiment can be more compact than the configuration of the first embodiment.

The summary of the seventh embodiment is set forth as follows.

(1) The auxiliary guiding shaft made of a soft magnetic material and disposed parallel to the drive shaft is provided, and the magnetic field generation portion is disposed at a position at which a direction heading from the magnetic field generation portion to the auxiliary guiding shaft becomes perpendicular to the drive shaft.

As in the second embodiment, more than one hall element 13 can be disposed in the drive shaft direction in the seventh embodiment, too.

Eighth Embodiment

Figure 17:
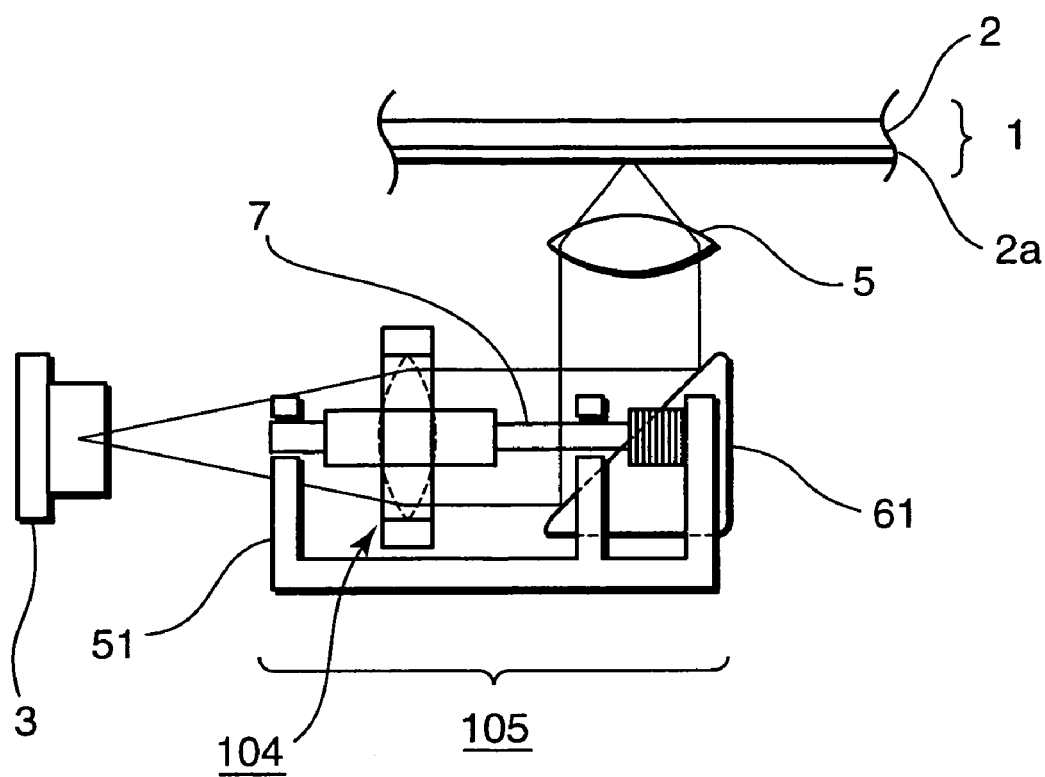
FIG. 17 is a view schematically showing a major portion of an optical head according to an eighth embodiment of the invention.
Figure 18:
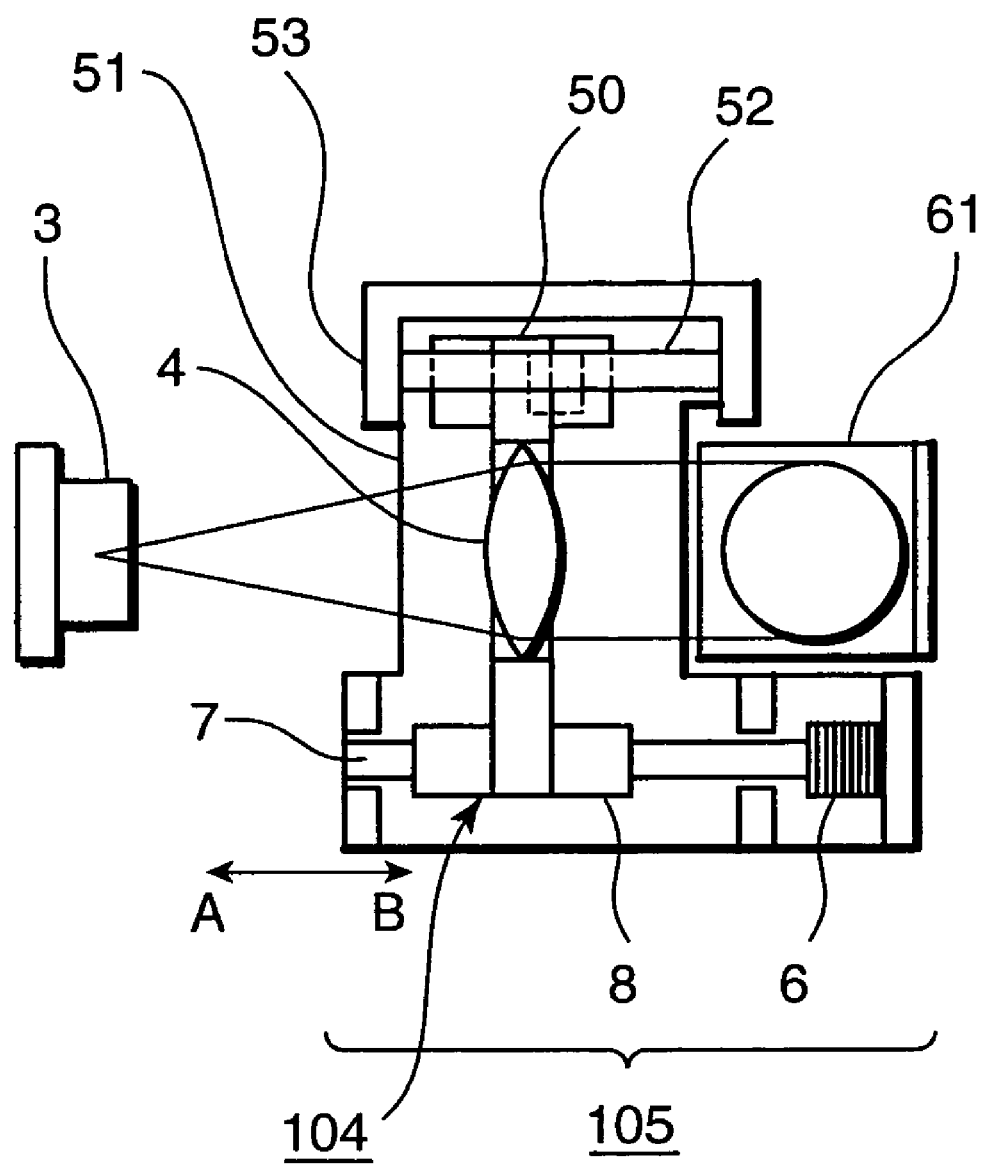
FIG. 18 is a schematic plan view of the optical head.

FIG. 17 and FIG. 18 are views schematically showing a major portion of an optical head according to an eighth embodiment of the invention. In the eighth embodiment, an entire aberration correction unit 105, including the movable portion 104, is of the same configuration as described in the seventh embodiment.

In the optical head of this embodiment, the laser light source 3 is disposed on the opposite side of the seventh embodiment with respect to the aberration correction lens 4, and a mirror 61 is disposed in a space between the aberration correction lens 4 and the objective lens 5. The mirror 61 is positioned at a side portion of the piezoelectric element 6. In this optical head, the mirror 61 is disposed to come in between the drive shaft 7 and the auxiliary guiding shaft. When configured in this manner, a dead space on the side of the mirror 61 can be utilized effectively, which can contribute to a reduction of the optical head in size.

As a general rule, the piezoelectric element 6 is placed on an extension of the drive shaft 7, and the piezoelectric element 6 can be accommodated just in the side portion of the mirror 61. Also, the magnet 12 that moves together with the movable portion 104 is also accommodated in the mirror side portion, which can contribute to improvements of a space factor.

The summary of the eighth embodiment is set forth as follows.

(1) The drive shaft is disposed parallel to the optical disk, and the auxiliary guiding shaft disposed parallel to the drive shaft and a mirror that deflects a flux of light from the laser light source to a direction of the normal to the optical disk are provided. The mirror is disposed in a space between the aberration correction lens and the objective lens, and is also disposed in a space between the drive shaft and the auxiliary guiding shaft.

As in the second embodiment, more than one hall element 13 can be disposed in the drive shaft direction in the eighth embodiment, too.

Ninth Embodiment

Figure 5:
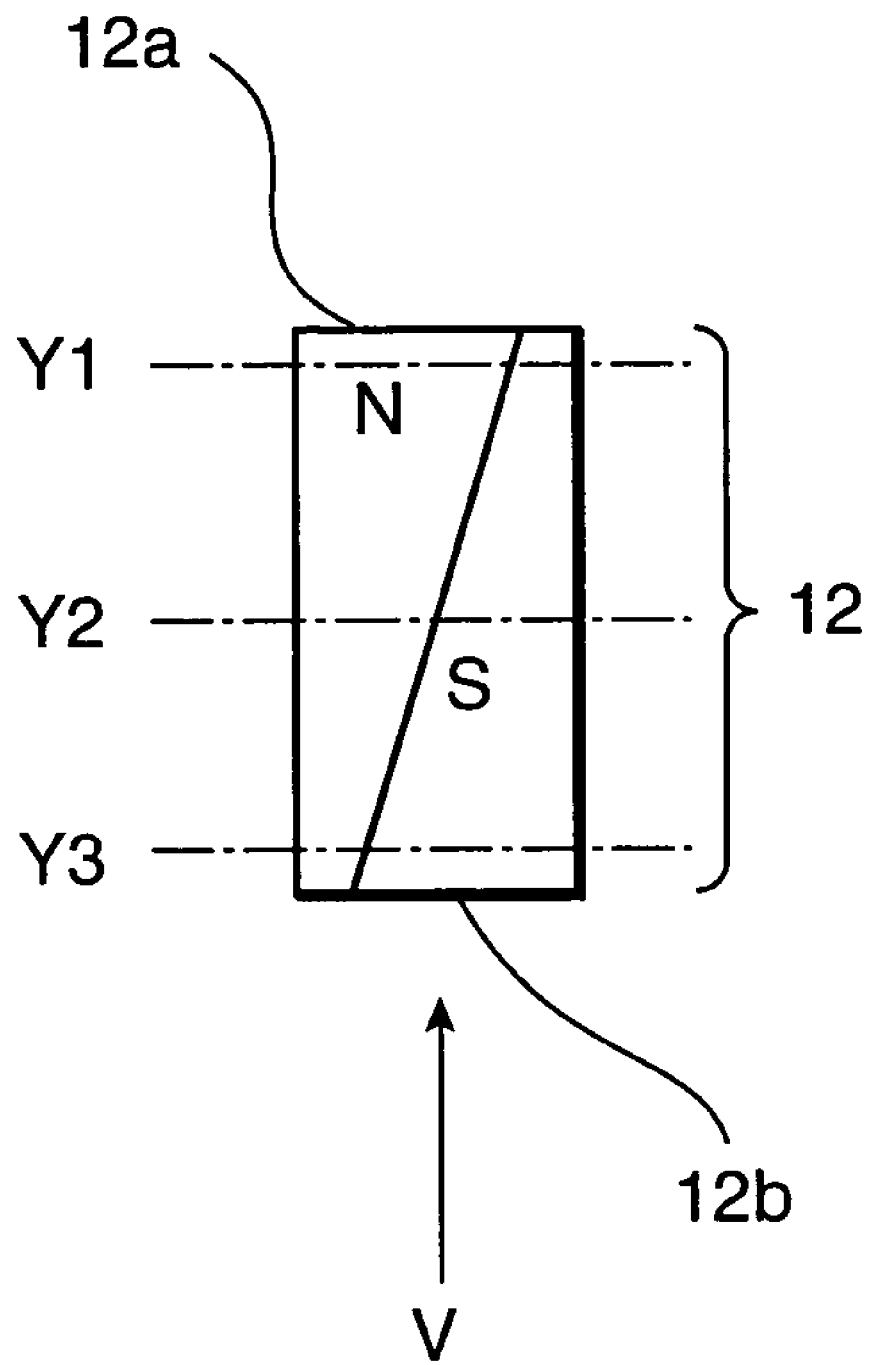
FIG. 5 is a view used to describe respective cross sections of the magnet.
Figure 6A:
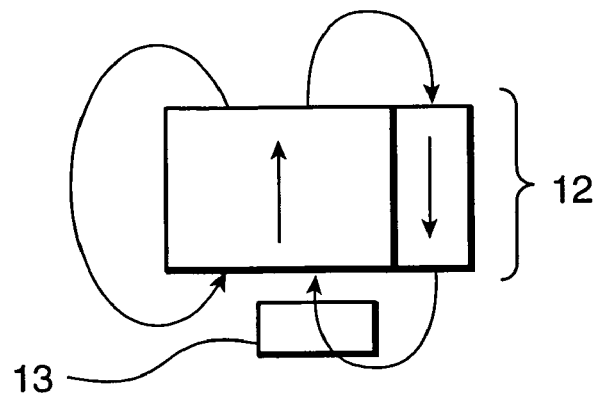
FIG. 6A is a view showing a magnetic flux in a cross section Y1.
Figure 6B:
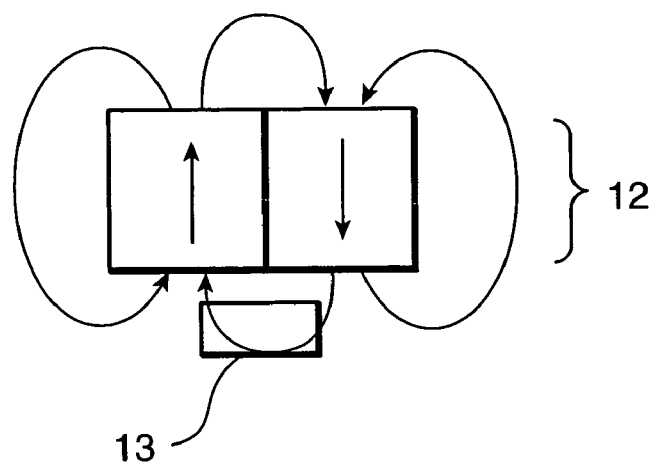
FIG. 6B is a view showing a magnetic flux in a cross section Y2.
Figure 6C:
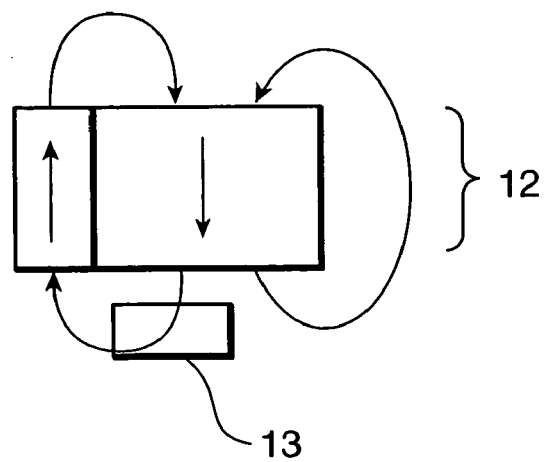
FIG. 6C is a view showing a magnetic flux in a cross section Y3.

In the respective embodiments described above, the magnet 12 is a magnet comprising two wedge-shaped region as are shown in FIG. 4 and FIG. 5. The magnet 12, however, is not limited to those shown in FIG. 4 and FIG. 5.

Figure 19A:
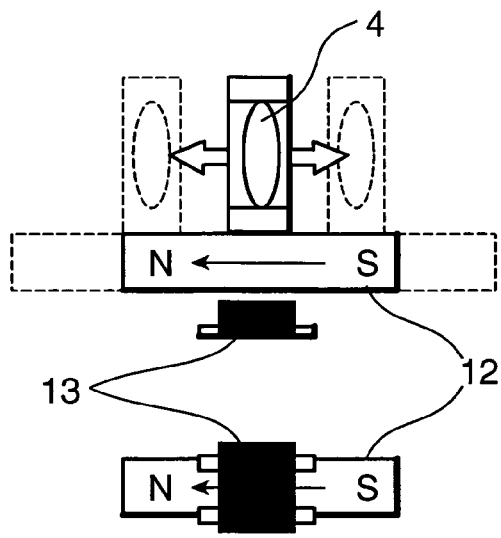
FIG. 19A is a view showing a magnet and a hall element in a ninth embodiment of the invention.

A relation of the magnet and the hall element when magnets of other embodiments are used will be described with reference to FIG. 19A through FIG. 19C. FIG. 19A shows a major portion when a simple bar-shaped magnet 12 is used. As in the respective embodiments described above, the magnet 12 and the aberration correction lens 4 move mechanically as one unit via the aberration correction base 11, the lens holder 10 and the like. The magnet 12 and the hall element 13 oppose each other, and a quantity of magnetic flux added to the hall element 13 varies with the relative position. The hall element 13 generates an output signal corresponding to the position of the aberration correction lens 4. This configuration can save the cost of components because a simple magnet can be used.

Figure 19B:
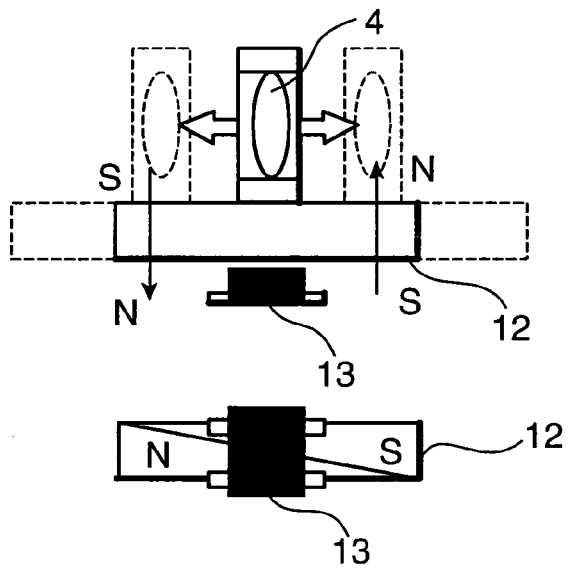
FIG. 19B is a view showing another configuration.

FIG. 19B shows a magnet comprising two-divided portions in the shape of wedge, and because it is the same as the magnet shown in FIG. 4 and FIG. 5, descriptions are omitted herein. The magnet 12 may be formed by laminating two magnets or polarizing one magnet in two divided portions. When configured in this manner, the sensitivity becomes high and the linearity of the conversion characteristic of the placed position of the aberration correction lens 4 to a position signal becomes satisfactorily. Aberration can be therefore corrected more precisely.

Figure 19C:
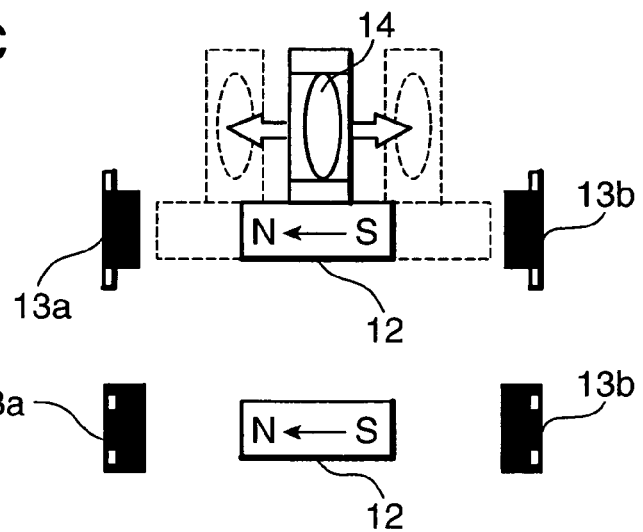
FIG. 19C is a view showing still another configuration.
Figure 20:
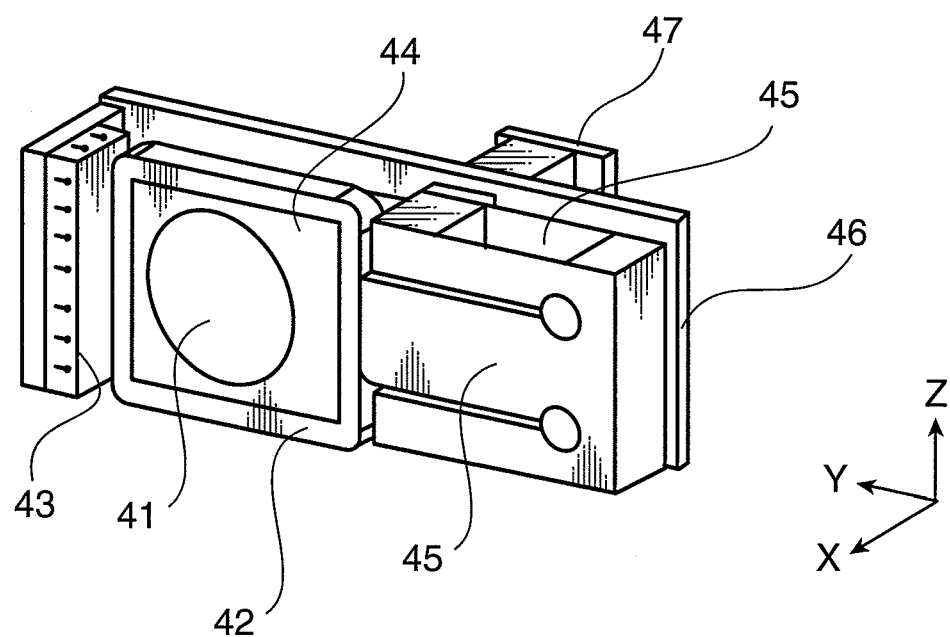
FIG. 20 is a perspective view showing a major portion of an optical head in the related art.

FIG. 19C shows an example in the case of using a relatively short bar magnet 12. The bar magnet 12 is disposed in a space between two hall elements 13a and 13b disposed oppositely, and is configured to be movable between the hall elements 13a and 13b. When configured in this manner, because a simple bar magnet is used as the magnet 12, a volume occupied by the magnet 12 can be reduced. Also, because an interval from the magnet 12 to the hall elements 13a and 13b can be set larger, a risk of mutual contact or collision can be lessened to the least. In addition, the need of an accurate adjustment of a gap between the magnet 12 and the hall elements 13a and 13b is eliminated. Moreover, by detecting a difference between outputs from the two hall elements 13a and 13b, it is possible to cancel out the noises or cancel out the temperature characteristic.

In the embodiments shown in FIG. 19A and FIG. 19C, the same idea as the one adopted to the magnet 18 and the hall element 17 in FIG. 14 can be applied. In other words, an output signal from the hall element in FIG. 19A and FIG. 19C can be corrected by obtaining a signal equivalent to a reference position signal by adding a magnetic flux of the reference magnet to the reference hall element. In the case of FIG. 19C, two reference magnets and two hall elements may be provided.

In the respective embodiments described above, an example using the hall element as the magnetic field detection portion has been described. The invention, however, is not limited to this example. For example, an MR element or the like can be used as well.

Also, in the respective embodiments described above, an example in a case where the hall element used as the magnetic field detection portion is mounted on the aberration correction base has been described. The invention, however, is not limited to this example. In short, any configuration is possible as long as a hall element is provided in a portion that does not move relatively with respect to the aberration correction base. For example, the hall element may be mounted on the optical head at its own base.

Also, in the respective embodiments described above, it is configured to use the aberration correction base. The invention, however, is not limited to this configuration. For example, it may be formed as a part of the structure of the optical head. Even when configured in this manner, the invention can be achieved mechanically without any difference. In short, any structural body is available as long as it functions as the lens holder, the frictional holding body, and the aberration correction base.

There is no technical problem in fabricating an optical disk device incorporating the optical head of the fourth, seventh, or eighth embodiment. For example, such an optical disk device can be fabricated using the same configuration as the second and third embodiments. In these cases, the resulting device can also achieve the effect of the invention effectively.

INDUSTRIAL APPLICABILITY

The invention can be used as an optical head that irradiates a flux of light from the laser light source onto an optical disk through the objective lens.

What is claimed is:

1. An optical head comprising:
   a laser light source emitting a flux of light;
   an objective lens, the flux of light from the laser light source to an optical disk passing through the objective lens;
   a lens holder holding an aberration correction lens in a space between the laser light source and the objective lens;
   a drive shaft disposed to extend in a direction parallel to an optical axis of the flux of light, the drive shaft guiding the lens holder in the extended direction;
   a piezoelectric element provided at an end portion of the drive shaft, the piezoelectric element being capable of extending and contracting in a drive shaft direction in response to an applied voltage;
   a base including a bottom portion, and a pair of supporting portions provided to stand on the bottom portion while being spaced apart in a direction of the optical axis, each of the supporting portions having a through hole in which the drive shaft is inserted; and
   a position detection portion detecting a position of the aberration correction lens in the drive shaft direction, the position detection portion including a magnetic field generation portion and a magnetic field detection portion disposed to be allowed to undergo displacement with respect to the magnetic field generation portion in the direction of the optical axis, one of the magnetic field generation portion and the magnetic field detection portion being arranged on the base and the other of the magnetic field generation portion and the magnetic field detection portion being arranged on the lens holder,
   wherein the lens holder is movable relatively with respect to the drive shaft in the drive shaft direction by varying a change rate when the applied voltage to the piezoelectric element is increased and decreased.

2. The optical head according to claim 1, wherein:
   a voltage that gives a rise to a change causing the drive shaft to slide with respect to the lens holder and a voltage that gives a rise to a change causing the drive shaft to move integrally with the lens holder are repetitively applied to the piezoelectric element.

3. The optical head according to claim 1, wherein:
   the magnetic field detection portion is disposed so as to protrude from the bottom portion of the base.

4. The optical head according to claim 1, wherein:
   more than one magnetic field detection portion is disposed in a line along the drive shaft direction.

5. The optical head according to claim 1, further comprising:
   a correction magnetic field detection portion provided at a position unsusceptible to a magnetic field generated by the magnetic field generation portion in such a manner that a direction of magnetic field sensitivity is aligned with a direction of magnetic field sensitivity of the magnetic field detection portion.

6. The optical head according to claim 5, wherein:
   a correction magnetic field generation portion is provided adjacent to the correction magnetic field detection portion.

7. The optical head according to claim 1, further comprising:
   an auxiliary guiding shaft made of a soft magnetic body, the auxiliary guiding shaft disposed parallel to the drive shaft,
   wherein the magnetic field generation portion is disposed at a position at which a direction heading from the magnetic field generation portion to the auxiliary guiding shaft becomes perpendicular to the drive shaft.

8. The optical head according to claim 1, wherein:
   the lens holder comes in contact with the drive shaft via a frictional holding body.

9. The optical head according to claim 1, wherein:
   the drive shaft is disposed parallel to the optical disk;
   the optical head further comprises an auxiliary guiding shaft disposed parallel to the drive shaft and a mirror that deflects a flux of light from the laser light source in a direction of a normal to the optical disk; and
   the mirror is disposed in a space between the aberration correction lens and the objective lens and also in a space between the drive shaft and the auxiliary guiding shaft.

10. The optical head according to claim 8, wherein:
    the frictional holding body is made of a resin material containing a fluorine-based compound or fluorine-based resin.

11. The optical head according to claim 1, further comprising:
    a temperature sensor that detects a temperature of the optical head.

12. The optical head according to claim 1, wherein:
    the aberration correction lens corrects spherical aberration.

13. An optical disk device comprising:
    the optical head according to claim 1; and
    a control portion that adjusts an applied voltage to the piezoelectric element according to a detection result on the optical head by the position detection portion.

14. The optical disk device according to claim 13, wherein:
    the control portion is configured to be capable of acquiring disk identification information provided to the optical disk; and
    the optical disk device further comprises a storage portion that stores a set position of the aberration correction lens in response to the disk identification information.

15. An optical disk device comprising:
    the optical head according to claim 5; and
    a control portion that adjusts an applied voltage to the piezoelectric element according to a detection result on the optical head by the position detection portion,
    wherein the control portion is configured to correct a set position of the aberration correction lens according to a detection result on the optical head by the correction magnetic field detection portion.

16. The optical disk device according to claim 15, wherein:
    the optical head includes a correction magnetic field generation portion provided adjacent to the correction magnetic field detection portion.

17. An optical disk device comprising:
    the optical head according to claim 11; and
    a control portion that adjusts an applied voltage to the piezoelectric element according to a detection result on the optical head by the position detection portion,
    wherein the control portion is configured to correct a set position of the aberration correction lens according to a temperature detected by the temperature sensor.

* * * * *

UNITED STATES PATENT AND TRADEMARK OFFICE
CERTIFICATE OF CORRECTION

PATENT NO. : 7,519,979 B2
APPLICATION NO. : 10/588113
DATED : April 14, 2009
INVENTOR(S) : Osamu Mizuno et al.

Page 1 of 1

It is certified that error appears in the above-identified patent and that said Letters Patent is hereby corrected as shown below:

Title Page

In Section (87), PCT Pub. Date, "Dec. 1, 2006" should read --Jan. 12, 2006--.

Signed and Sealed this

Thirteenth Day of October, 2009

David J. Kappos
*Director of the United States Patent and Trademark Office*